United States Patent
Finch et al.

(10) Patent No.: US 8,917,284 B2
(45) Date of Patent: Dec. 23, 2014

(54) VECTOR GRAPHICS WITH CONTROLLED THIN-PLATE SPLINES

(75) Inventors: Mark Finch, Redmond, WA (US); John Michael Snyder, Redmond, WA (US); Hugues H. Hoppe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 13/134,878

(22) Filed: Jun. 20, 2011

(65) Prior Publication Data
US 2012/0320063 A1 Dec. 20, 2012

(51) Int. Cl.
| G09G 5/00 | (2006.01) |
| G09G 5/02 | (2006.01) |
| G06T 11/20 | (2006.01) |
| G06F 15/00 | (2006.01) |
| G03F 3/08 | (2006.01) |
| H04N 1/46 | (2006.01) |
| G06K 9/00 | (2006.01) |
| G06K 9/40 | (2006.01) |
| G06K 9/36 | (2006.01) |

(52) U.S. Cl.
CPC .................................. G06T 11/203 (2013.01)
USPC ........... 345/606; 345/581; 345/589; 345/611; 345/442; 345/619; 358/1.9; 358/518; 358/525; 382/162; 382/254; 382/276

(58) Field of Classification Search
USPC .................. 345/418, 581, 589, 600, 606, 611, 345/616–619, 636, 643–644, 441–442, 443, 345/469–470; 358/1.1, 1.9, 3.01, 518, 525, 358/537, 462, 493, 494; 382/162, 165, 167, 382/190, 253, 254, 264, 266, 274, 276
See application file for complete search history.

(56) References Cited

U.S. PATENT DOCUMENTS

| 4,907,282 A * | 3/1990 | Daly et al. ..................... 382/242 |
| 6,184,953 B1 * | 2/2001 | Greene et al. ................... 349/74 |
| 6,784,896 B1 | 8/2004 | Perani et al. |
| 7,068,825 B2 * | 6/2006 | Rubbert et al. ............... 382/128 |
| 7,868,885 B2 | 1/2011 | Zhou et al. |

(Continued)

OTHER PUBLICATIONS

Desbrun, et al., "Implicit Fairing of Irregular Meshes using Diffusion and Curvature Flow", Retrieved at <<http://www.multires.caltech.edu/pubs/ImplicitFairing.pdf>>, Proceedings of the 26th annual conference on Computer graphics and interactive techniques, vol. 33, 1999, pp. 8.

(Continued)

*Primary Examiner* — Wesner Sajous
(74) *Attorney, Agent, or Firm* — Sandy Swain; Judy Yee; Micky Minhas

(57) ABSTRACT

This patent relates to thin plate spline (TPS)-based interpolation techniques for representing free-flowing vector graphics (VG) images based on user-specified features, such as points and curves. One or more features can be identified in a pixel grid. A higher-order least squares interpolating function with a TPS smoothness objective can then be utilized to interpolate individual color values to individual pixels of the pixel grid. Smoothness terms of the function that impose smoothness penalties can be interrupted in certain regions of the pixel grid based on attributes of the user-specified features. For example, a curve attribute can specify a particular color value(s), add or remove a smoothness penalty, or anisotropically impose a first derivative constraint in a particular direction.

20 Claims, 8 Drawing Sheets
(5 of 8 Drawing Sheet(s) Filed in Color)

(56) References Cited

U.S. PATENT DOCUMENTS

| | | | |
|---|---|---|---|
| 2003/0198378 A1* | 10/2003 | Ng | 382/154 |
| 2003/0219152 A1* | 11/2003 | August | 382/131 |
| 2007/0047838 A1 | 3/2007 | Milanfar et al. | |
| 2007/0057930 A1 | 3/2007 | Iwema et al. | |
| 2008/0278479 A1* | 11/2008 | Sun et al. | 345/419 |
| 2009/0067755 A1 | 3/2009 | Khamene et al. | |
| 2012/0229485 A1* | 9/2012 | Rhodes et al. | 345/545 |
| 2013/0082830 A1* | 4/2013 | Rosen et al. | 340/407.2 |
| 2013/0127856 A1* | 5/2013 | Winnemoeller et al. | 345/423 |

OTHER PUBLICATIONS

Gronde, Jasper Van De, "A High Quality Solver for Diffusion Curves", Retrieved at <<http://scripties.fwn.eldoc.ub.rug.nl/FILES/scripties/Informatica/Master/2010/Gronde.J.J.van.de./ThesisJvdGFinal2.pdf>>, Dec. 20, 2010, pp. 42.

Lai, et al., "Fast Automatic, Topology-Preserving Gradient Mesh Generation for Image Vectorization", Retrieved at <<http://ralph.cs.cf.ac.uk/papers/Geometry/ImageVectorization.pdf>>, 2009, pp. 8.

Orzan, et al., "Diffusion curves: a vector representation for smooth-shaded images", Retrieved at <<http://artis.imag.fr/Publications/2008/OBWBTS08/diffusion_curves.pdf>>, In Proceedings of ACM SIGGRAPH 2008 papers, ACM Transactions on Graphics (TOG), vol. 27, Issue 03, Aug. 2008, pp. 8.

Bezerra, et al., "Diffusion constraints for vector graphics", Retrieved at <<http://artis.imag.fr/Publications/2010/BEDT10/BezEisDecTho_NPAR2010.pdf>>, Proceedings of the 8th International Symposium on Non-Photorealistic Animation and Rendering, vol. 01, Issue 212, Jun. 2010, pp. 1-8.

Hnaidi, et al., "Feature based terrain generation using diffusion equation", Retrieved at <<http://liris.cnrs.fr/~egalin/Pdf/2010-terrain.pdf>>, Computer Graphics Forum proceeding of Pacific Graphics, vol. 29, Issue 07, Oct. 18, 2010, pp. 8.

Sun, et al., "Image Vectorization using Optimized Gradient Meshes", Retrieved at <<http://www.rose-hulman.edu/class/csse/csse451/papers/a11-sun.pdf>>, Proceedings of ACM SIGGRAPH 2007, ACM Transactions on Graphics (TOG), vol. 26, Issue 03, Jul. 2007, pp. 1-7.

Hulsey, Kevin, "Adobe Illustrator CS, CS4: Gradient Mesh Tool, Gradients & Blends", Retrieved at <<http://www.khulsey.com/adobe_illustrator_gradient_mesh.html>>, Retrieved Date: Feb. 14, 2011, pp. 3.

Xia et al., "Patch-Based Image Vectorization with Automatic Curvilinear Feature Alignment", ACM Transactions On Graphics, vol. 28 No. 5, pp. 115:1-115:10, 2009.

Agarwala, A., "Efficient Gradient-Domain Compositing Using Quadtrees", ACM Transactions on Graphics, vol. 26 No. 3, 2007.

Press et al., "Numerical Recipes in C (2nd Edition): The Art of Scientific Computing", Cambridge University Press, 1992.

Bertalmio et al., "Image Inpainting", Proceedings of the 27th Annual Conference on Computer Graphics and Interactive Techniques, pp. 417-424, 2000.

Bookstein, Fred, "Principal Warps: Thin-Plate Splines and the Decomposition of Deformations", IEEE Transactions on Pattern Analysis and Machine Intelligence, vol. 11 No. 6, Jun. 1989.

Botsch et al., "Efficient Linear System Solvers for Mesh Processing", Mathematics of Surfaces IX, vol. 3604 of LNCS, pp. 62-83, 2005.

Botsch et al., "On Linear Variational Surface Deformation Methods", IEEE Transactions on Visualization and Computer Graphics, vol. 14 No. 1, 2008.

Botsch et al., "An Intuitive Framework for Real-Time Freeform Modeling", ACM Transactions on Graphics, vol. 23 No. 3, 2004.

Courant et al., Methods of Mathematical Physics, vol. 1. London, 1953.

Douchon, J., "Splines Minimizing Rotation-Invariant Semi-Norms in Sobolev Spaces", Constructive Theory of Functions of Several Variables, pp. 85-100, 1977.

Fisher et al., "Design of Tangent Vector Fields", ACM Transactions on Graphics, vol. 26 No. 3, 2007.

Georgiev, T., "Photoshop Healing Brush: A Tool for Seamless Cloning", Proceedings of the Workshop on Applications of Computer Vision (ECCV), 2004.

Jacobsen et al., "Mixed Finite Elements for Variational Surface Modeling", Computer Graphics Forum, vol. 30 No. 2, pp. 1565-1574, 2010.

Jeschke et al., "Rendering Surface Details with Diffusion Curves", ACM Transactions on Graphics, vol. 28 No. 5, 2009.

Jeschke et al., "Estimating Color and Texture Parameters for Vector Graphics" Computer Graphics Forum, vol. 30 No. 2, pp. 523-532, 2011.

Johnston, Scott F., "Lumo: Illumination for Cel Animation" Proceedings of the 2nd International Symposium on Non-Photorealistic Animation and Rendering, 2002.

Joshi et al., "Repoussé: Automatic Inflation of 2D Artwork", Eurographics Workshop on Sketch-Based Modeling, 2008.

Moreton et al., "Functional Optimization for Fair Surface Design", Computer Graphics, pp. 167-176, Jul. 1992.

Perez et al., "Poisson Image Editing" ACM Transactions on Graphics, vol. 22 No. 3, 2003.

Sorkine et al., "Least-Squares Meshes" Proceedings of Shape Modeling International, 2004.

Szeliski, R., "Locally Adapted Hierarchical Basis Preconditioning" ACM Transactions on Graphics, vol. 25 No. 3, 2006.

Takayama et al., "Volumetric Modeling with Diffusion Surfaces" ACM Transactions on Graphics, vol. 29 No. 6, 2010.

Tanner et al., "The Clipmap: A Virtual Mipmap", Proceedings of the 25th Annual Conference on Computer Graphics and Interactive Techniques, pp. 151-158, 1998.

Terzopoulos, Demetri, "Multilevel Computational Processes for Visual Surface Reconstruction", Computer Vision, Graphics and Image Processing, vol. 24 No. 1, pp. 52-96, 1983.

Terzopoulos, Demetri, "The Computation of Visible-Surface Representations", IEEE Transactions on Pattern Analysis and Machine Intelligence, vol. 10 No. 4, 1988.

Wahba, G., "Spline Models for Observational Data", CBMS-NSF Regional Conference Series in Applied Mathematics, vol. 59, Philadelphia, 1990.

Welch et al., "Variational Surface Modeling" Proceedings of the 19th Annual Conference on Computer Graphics and Interactive Techniques, pp. 157-166, 1992.

* cited by examiner

VECTOR GRAPHICS WITH CONTROLLED THIN-PLATE SPLINES

BACKGROUND

Traditional vector graphics techniques specify relatively simple and limited color functions to independently fill closed shapes. More recent approaches include somewhat more sophisticated interpolation tools, such as gradient meshes and diffusion curves. While these tools allow for more complex color gradients in images, they nevertheless suffer from shortcomings. For example, creating and manipulating gradient meshes, which interpolate over a lattice of color values at each vertex across a uniform grid or mesh, can be extremely tedious since individual colors typically need to be specified at numerous mesh vertices.

Diffusion curves, in turn, allow a user to create image features over a more flexible network of curves rather than over a mesh lattice. Each diffusion curve constrains the image along that curve, with a separately-controllable color value on each of its two sides. Color along the curve is typically specified as two color values (one for each side) at each curve control point. These colors are then diffused away from the set of diffusion curves to the rest of the image by using an interpolating function based on solving Laplace's equation. However, Laplacian diffusion yields derivative discontinuities at constraints. A diffusion curve forms a "crease" even if the same color value is specified on both its sides. A color constraint at an isolated point (rather than a curve) yields an objectionable "tent-like" interpolation result.

In addition to the unnatural appearance and the need to specify sets of colors along each curve, there are other drawbacks associated with diffusion curves as well. For example, a user is typically limited to a single type of primitive, namely the diffusion curve feature, for editing the image. Furthermore, Laplacian diffusion does not extrapolate away from constraints. Smoothly filling an irregular region requires specifying colors along the region's entire boundary and can't be controlled using a sparse set of points within the region.

SUMMARY

Thin plate spline (TPS)-based interpolation techniques are described for representing free-flowing vector graphics (VG) images (i.e., images) based on user-specified geometric artifacts (i.e., features), such as points and curves. These techniques utilize a TPS-based approach that defines a higher-order function with a generalized TPS smoothness objective. In at least one embodiment, the higher-order function can be utilized to interpolate individual color values at individual pixels of a pixel grid while eliminating unwanted derivative discontinuities. As a result, a smooth, natural-looking color continuum can be provided across an image, including between individual pixels on different sides of user-specified features.

By utilizing the described techniques, a VG tool can be provided that allows a user to easily create and/or edit the image by creating (e.g., sketching) points and/or curves that define the image. For example, a curve feature (i.e., curve) that specifies one or more color values can be created. Based at least in part on the specified color value(s), individual color values can then be interpolated away from the curve feature to individual pixels in the pixel grid smoothly without causing an unwanted derivative discontinuity at the curve feature.

In at least one embodiment, various types of features can be defined that may be created by a user in the pixel grid. For example, one or more types of points can be defined with an attribute(s) that specifies a color value for one or more pixels in the pixel grid. As another example, one or more types of curves can be defined with an attribute(s) that specifies one or more color values for pixels along the curve, adds or removes one or more smoothness constraints along the curve, and/or that adds a first derivative (FD) constraint in a particular direction.

Once one or more features have been created by the user and identified in the pixel grid, a TPS-based higher-order least squares interpolating function (HOLSIF) can be utilized. The HOLSIF can be defined in terms of a smoothness objective with a minimizer that determines a color value at each individual pixel of the pixel grid. An example minimization approach is to set the partial derivatives of the HOLSIF objective with respect to each pixel value to zero and then solve the resulting linear system.

In at least one embodiment the HOLSIF's smoothness objective can be a generalized TPS smoothness objective that is quadratic and based on the sum of a number of different terms of the HOLSIF. For example, the HOLSIF can include a second-derivative (SD) term that represents the squared SDs over the pixels of the image. A second order smoothness penalty can thus be imposed on the pixels of the pixel grid by penalizing non-zero SDs when solving the HOLSIF.

The HOLSIF can also include a first-derivative (FD) term that represents the squared FDs over the pixels, and thus imposes a first order smoothness penalty on the pixels by penalizing non-zero FDs when solving the HOLSIF. The HOLSIF can also include a zero-derivative (ZD) term that represents individual squares of the individual color values of the set, and thus introduces a zero order smoothness penalty.

In addition to the SD, FD, and ZD terms, the HOLSIF can also include a constraint term that represents color value and/or derivative constraints introduced by the attributes of the feature(s) created by the user. These attribute(s) can thus interrupt the smoothness penalties of the SD, FD, and ZD terms that may be imposed on individual pixels of the pixel grid when the HOLSIF is solved. In other words, the default smoothness penalties imposed by the SD, FD, and ZD terms can be interrupted in those regions of the pixel grid (i.e., on and/or between individual pixel(s)) that are subject to constraints imposed by the constraint term.

For example, a curve attribute may interrupt the default smoothness penalties imposed by the SD, FD, and ZD terms by removing SD smoothness penalties for one or more of the pixels in the pixel grid. Alternatively or additionally, a curve attribute may anisotropically impose an FD constraint (e.g., zero FD constraint) for the pixel(s) in a particular direction. As a result, a variety of interesting curve types can be defined.

To allow for individual combinations of pixels of the pixel grid to be represented in the HOLSIF, certain types of kernels can be identified in the pixel grid. Each kernel can be thought of as a linear combination of color values for a group of pixels in the pixel grid. In at least one embodiment, each kernel can include a combination of color values for a group of adjacent pixels (i.e., pixels adjacent one another in the pixel grid).

With respect to the SD and FD terms of the HOLSIF, a number of types of kernels can be identified in the pixel grid. For example, discrete SD smoothness kernels (SDS kernels) can be identified and represented (i.e., squared and summed) as an SD term(s) in the HOLSIF. Each SDS kernel can thus impose a second order smoothness penalty for a discrete group of individually adjacent pixels of that SDS kernel. Similarly, discrete FD kernels (FD kernels) can be identified and represented (i.e., squared and summed) as an FD term(s) in the HOLSIF. Each FD kernel can thus impose a first order smoothness penalty for a discrete group of individually adjacent pixels of that SDS kernel.

With respect to the constraint term(s) of the HOLSIF, a number of additional kernel types can be identified as well. For example, color value constraint (CVC) kernels that allow for an isolated color value constraint to be imposed on a particular combination of adjacent pixels in the pixel grid, and/or on individual pixels along a curve, can be represented (squared and summed) as a constraint term(s).

Additionally, generalized FD kernels (GFD kernels) can also be identified in the pixel grid and represented (i.e., squared and summed) as a constraint term(s) in the HOLSIF. Each GFD kernel can impose an FD constraint (e.g., zero FD constraint) in a particular direction for a discrete group of individually adjacent pixels of that GFD kernel. For example, each GFD kernel can penalize non-zero FDs in the particular direction. As explained in further detail below, in at least some embodiments, the direction of the FD constraint of the GFD kernel can be anisotropically controlled by attributing weights to the GFD kernel's pixels.

The identification of kernels in the pixel grid can allow for a variety of interesting curve types to be defined. For example, a tear curve may be defined with an attribute that causes SDS kernels that straddle the tear curve (i.e., overlapping SDS kernels) to be removed. As a result, color values between pixels on different sides of tear curves may be caused to break discontinuously.

As another example, a crease curve can be defined with an attribute that not only causes overlapping SDS kernels to be removed, but also causes GFD kernels to be formed along the crease curve.

Further examples of curve types include contour curves and slope curves. Like a crease curve, a contour curve or slope curve can introduce GFD kernels along that contour curve or slope curve, respectively. However, unlike a crease curve, contour curves and slope curves may not remove SDS kernels. Instead, GFD kernels can be effectively introduced along these curves in addition to SDS kernels along these curves.

In at least one embodiment, various types of compound curves can be defined. A compound curve can include two or more individual curves of any type or types. For example, two or more of the curve types described above can be combined to define a compound curve. As a result, the user can cause multiple individual curves to be created in the pixel grid simply by sketching or selecting a single compound curve—thus decreasing the amount of work for the user while also increasing the user's control.

The offset distance between individual curves in a compound curve can be controlled (e.g., user-specified, predetermined, etc.) to influence the resulting visual effects of the compound curve. Furthermore, individual compound curves can be created by the user ad hoc and/or predefined for the user's selection.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements.

DETAILED DESCRIPTION

Overview

Figure 1:
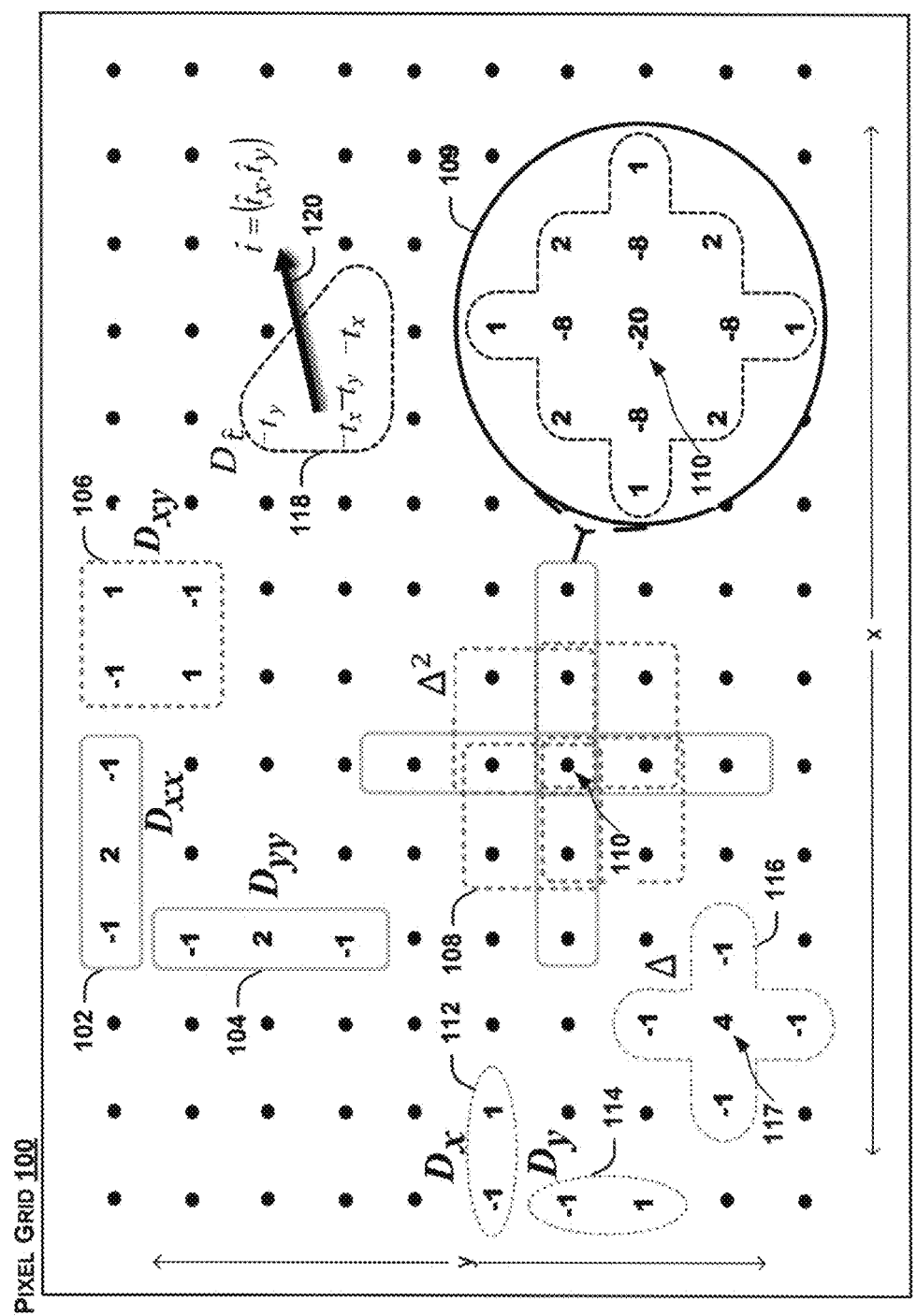
FIG. 1 illustrates an example pixel grid in which the described TPS-based interpolation techniques may be implemented, in accordance with at least one embodiment.

Thin plate spline (TPS)-based interpolation techniques are described for representing free-flowing vector graphics (VG) images (i.e., images) based on user-specified geometric artifacts (i.e., features), such as points and curves. These techniques utilize a TPS-based approach that defines a higher-order function with a generalized TPS smoothness objective. These interpolation techniques, including utilizing the higher-order function, can be utilized to interpolate any suitable data type characteristic or characteristics (e.g., a value(s), a field(s), etc.) associated with a VG image, such as pixel color values, scalar height fields, direction vector fields, texture coordinate values, and the like. For discussion purposes, these interpolation techniques are described herein with respect to interpolating color values to pixels associated with a VG image. However, this is but one example, and these techniques are thus not limited to the interpolation of just pixel color values.

In at least one embodiment, the higher-order function can be utilized to interpolate individual color values (e.g., pixel values based on a three-channel Red, Green, Blue (RGB) model or on a four-channel RGB model with an additional transparency channel) at individual pixels of a pixel grid. The interpolation of the individual color values can reduce or eliminate unwanted color discontinuities (e.g., visible differences in color smoothness between pixels). As a result, a smooth-looking color continuum can be provided across the image, including between individual pixels on different sides of user-specified features.

By utilizing the described techniques, a VG tool can be provided that allows a user to easily create and/or edit an image by creating (e.g., sketching) point features (i.e., points) and/or curve features (i.e., curves) that define the image. For example, the curve can specify a constraint that the image color be a specified constant or vary in a specified way along the curve. Based at least in part on the specified color value(s), individual color values can then be interpolated away from the curve feature to individual pixels in the pixel grid smoothly without causing an unwanted derivative discontinuity at the curve feature.

In at least one embodiment, various types of features can be defined that may be created by a user in the pixel grid. For example, one or more types of points can be defined with an attribute(s) that specifies a color value for one or more pixels in the pixel grid. As another example, one or more types of curves can be defined with an attribute(s) that specifies one or more color values for pixels along the curve, adds or removes one or more smoothness constraints along the curve, and/or that adds a FD constraint in a particular direction.

Once one or more features have been created by the user and identified in the pixel grid, a TPS-based higher-order least squares interpolating function (HOLSIF) can be utilized. The HOLSIF can be defined in terms of a smoothness objective with a minimizer that determines a color value at each individual pixel of the pixel grid. An example minimization approach is to set the partial derivatives of the HOLSIF objective with respect to each pixel value to zero and then solve the resulting linear system.

In at least one embodiment the HOLSIF's smoothness objective can be a generalized TPS smoothness objective that is quadratic and based on the sum of a number of different terms of the HOLSIF. For example, the HOLSIF can include a second-derivative (SD) term that represents the squared SDs over the pixels of the image. A second order smoothness penalty can thus be imposed on the pixels of the pixel grid by penalizing non-zero SDs when solving the HOLSIF.

The HOLSIF can also include a first-derivative (FD) term that represents the squared FDs over the pixels, and thus imposes a first order smoothness penalty on the pixels by penalizing non-zero FDs when solving the HOLSIF. The HOLSIF can also include a zero-derivative (ZD) term that represents individual squares of the individual color values of the set, and thus introduces a zero order smoothness penalty.

In addition to the SD, FD, and ZD terms, the HOLSIF can also include a constraint term that represents color value and/or derivative constraints introduced by the attributes of the feature(s) created by the user. These attribute(s) can also interrupt (i.e., remove) HOLSIF smoothness terms or penalties that would otherwise have been imposed.

For example, a curve attribute may interrupt the default smoothness penalties imposed by the SD, FD, and ZD terms by removing an SD smoothness penalty for one or more of the pixels in the pixel grid. Alternatively or additionally, a curve attribute may anisotropically impose a FD smoothness constraint (e.g., zero FD constraint) for the pixel(s) in a particular direction. As a result, a variety of interesting curve types can be defined.

To allow for individual combinations of pixels of the pixel grid to be represented in the HOLSIF, certain types of kernels can be identified in the pixel grid. Each kernel can be thought of as a linear combination of color values for a group of pixels in the pixel grid. In at least one embodiment, each kernel can include a combination of color values for a group of adjacent pixels (i.e., pixels adjacent one another in the pixel grid).

With respect to the SD and FD terms of the HOLSIF, a number of types of kernels can be identified in the pixel grid. For example, discrete SD smoothness kernels (SDS kernels) can be identified and represented (i.e., squared and summed) as an SD term(s) in the HOLSIF. Each SDS kernel can thus impose a second order penalty for a discrete group of individually adjacent pixels of that SDS kernel. Similarly, discrete FD kernels (FD kernels) can be identified and represented (i.e., squared and summed) as an FD term(s) in the HOLSIF. Each FD kernel can thus impose a first order penalty for a discrete group of individually adjacent pixels of that SDS kernel.

With respect to the constraint term(s) of the HOLSIF, a number of additional kernel types can be identified as well. For example, color value constraint (CVC) kernels that allow for an isolated color value constraint to be imposed on a particular combination of adjacent pixels in the pixel grid, and/or on individual pixels along a curve, can be represented (squared and summed) as a constraint term(s).

Additionally, generalized FD kernels (GFD kernels) can also be identified in the pixel grid and represented (i.e., squared and summed) as a constraint term(s) in the HOLSIF. Each GFD kernel can impose a FD constraint (e.g., zero FD constraint) in a particular direction for a discrete group of individually adjacent pixels of that GFD kernel. For example, each GFD kernel can penalize non-zero FDs in the particular direction. As explained in further detail below, in at least some embodiments, the direction of the FD constraint of the GFD kernel can be anisotropically controlled by attributing weights to the GFD kernel's pixels.

As noted above, the identification of kernels in the pixel grid can allow for a variety of interesting curve types to be defined. For example, a tear curve may be defined with an attribute that causes SDS kernels that straddle the tear curve (i.e., overlapping SDS kernels) to be removed. As a result, color values between pixels on different sides of tear curves may be caused to break discontinuously.

Since individual pixels in the pixel grid can be grouped into SDS kernels by default, a tear curve can introduce a discontinuity into the pixel grid (and thus image) by removing the second order smoothness term imposed by the SDS kernels. As a result, smoothness of color values between pixels on different sides of the tear curve is no longer penalized, resulting in an intentional discontinuity.

As another example, a crease curve can be defined with an attribute that not only causes overlapping SDS kernels to be removed, but also causes GFD kernels to be formed along the crease curve. The crease curve can thus introduce a derivative discontinuity by removing a second order smoothness penalty for pixels previously grouped in a removed SDS kernel and by anisotropically imposing a FD constraint. For crease curves, this zero FD constraint can be imposed in the curve's normal direction.

Further examples of curve types include contour curves and slope curves. Like a crease curve, a contour curve or slope curve can introduce GFD kernels along that contour curve or slope curve, respectively. However, unlike a crease curve, contour curves and slope curves may not remove SDS kernels. Instead, GFD kernels can be effectively introduced along these curves in addition to SDS kernels along these curves.

With respect to contour curves in particular, the direction of GFD kernels along a contour curve can be anisotropically controlled in the direction of the tangent vector to the contour curve. In at least one embodiment, this can be accomplished by attributing weights to each of the pixels of a GFD kernel such that the GFD kernel constrains linear zero FD derivatives in the direction of the tangent vector.

As a result, non-zero FDs can be penalized in the direction of the tangent vector to the contour curve such that pixels along the contour curve are attributed the same color value. Visually, this may be analogous to a terrain having a particular elevation on a contour map. The color value may not necessarily be specified explicitly by the user, and can instead be a color value associated with a low (e.g., the lowest) quadratic energy for individual kernels along the contour curve.

With respect to slope curves, the direction of GFD kernels along a slope curve can be anisotropically controlled in a direction normal to the slope curve. In at least one embodiment, this can be accomplished by attributing weights to each of the pixels of each GFD kernel so that linear zero FDs are constrained in that direction.

In at least one embodiment, various types of compound curves can be defined. A compound curve can include two or more individual curves of any type or types. For example, two or more of the curve types described above can be combined to define a compound curve. As a result, the user can cause multiple individual curves to be created in the pixel grid simply by sketching or selecting a single compound curve—thus decreasing the amount of work for the user while also increasing the user's control.

The offset distance between individual curves in a compound curve can be controlled (e.g., user-specified, predetermined, etc.) to influence the resulting visual effects of the compound curve. Furthermore, individual compound curves can be sketched by the user ad hoc, and/or selected by the user (e.g., from a collection of predefined compound curves).

Multiple and varied implementations are described herein. Generally, any of the features/functions described with reference to the figures can be implemented using software, hardware, firmware (e.g., fixed logic circuitry), manual processing, or any combination thereof. The terms "module", "tool", and/or "component" as used herein may generally represent software, hardware, firmware, or any combination thereof. For instance, the terms "tool" and "module" can represent software code and/or other types of instructions that perform specified tasks when executed on a computing device or devices.

Generally, the illustrated separation of modules, tools or components and functionality into distinct units may reflect an actual physical grouping and allocation of such software, firmware, and/or hardware. Alternatively or additionally, this illustrated separation can correspond to a conceptual allocation of different tasks to the software, firmware, and/or hardware. Furthermore, it is to be appreciated and understood that the illustrated modules, tools, and/or components and functionality described herein can be located at a single site (e.g., as implemented by a computing device), or can be distributed over multiple locations (e.g., as implemented over multiple computing devices).

Example Implementation

As described above, in accordance with the described techniques, a TPS-based approach that defines a higher order HOLSIF can be defined for a pixel grid of individual pixels and be utilized to interpolate color values to the individual pixels. The HOLSIF's smoothness objective can be a generalized TPS smoothness objective that is quadratic and based on the sum of various terms. In addition to SD, FD, and ZD terms that impose default smoothness penalties, the HOLSIF can also include a constraint term that represents constraints introduced by the attributes of the feature(s) created by the user. The default smoothness penalties imposed by the SD, FD, and ZD terms can also be interrupted by the same features that introduce constraint terms.

For example, one or more features may be created that define one or more color constraints, such as a color value(s). The HOLSIF can then be utilized to interpolate individual color values to some or all of the individual pixels in the image based on the color constraint(s) at specified positions of point(s) and/or curves in the image.

In operation, consider a variety of points and/or curves that are sketched in a pixel grid by a user. The generalized TPS smoothness objective can be mathematically defined as follows. Given a two-dimensional pixel grid with an x axis and a y axis, a set of individual color values u, a continuous and differentiable bivariate scalar function u(x,y), and its gradient $\nabla u=(u_x, u_y)$, Laplacian and bilaplacian differential operators may be defined via:

$$\Delta u = \nabla \cdot \nabla u = u_{xx} + u_{yy}$$

$$\Delta^2 u = \Delta(\Delta u) = u_{xxxx} + 2u_{xxyy} + u_{yyyy}$$

Solutions that satisfy the partial differentiable equations $\Delta u=0$ and $\Delta^2 u=0$ may be called harmonic and bi-harmonic respectively. Using the calculus of variations, where T[u] is a TPS objective for continuous functions, these equations may be utilized as minimizers of two respective smoothness objectives:

$$u^* = \underset{u}{\mathrm{argmin}} \int\int (\nabla u \cdot \nabla u) dx dy \Longrightarrow \Delta u^* = 0, \text{ and}$$

$$u^* = \underset{u}{\mathrm{argmin}} \int\int T[u] dx dy \Longrightarrow \Delta^2 u^* = 0,; \text{ where}$$

$$T[u] = (u_{xx})^2 + 2(u_{xy})^2 + (u_{yy})^2,$$

within a two-dimensional domain (e.g., a two-dimensional pixel grid) with suitable boundary conditions (e.g., Dirichlet for the first, Cauchy for the second). An FD membrane-like functional satisfies the first equation while a TPS-based HOLSIF satisfies the second equation. The TPS-based HOLSIF also results from a different objective formulation:

$$T'[u] = (\Delta u)^2 = (u_{xx} + u_{yy})^2.$$

Accordingly, TPS may be referred to as least-squares harmonic, and a TPS-based approach utilizing the HOLSIF as a least-squares harmonic approach.

In at least some embodiments, the SD term of the HOLSIF can be represented as an SD interpolating objective and discretized into the HOLSIF such that the HOLSIF's generalized TPS smoothness objective can be solved (e.g., minimized). An example of an SD interpolating objective is given by the following SD function:

$$\min_u \sum_{i,j} (D_{xx}^2[u])_{i,j} + 2(D_{xy}^2[u])_{i,j} + (D_{yy}^2[u])_{i,j},$$

where i indexes pixel columns in a pixel grid (i.e., pixels along the x axis) and j indexes pixel rows in the pixel grid (i.e., pixels along the y axis). Examples of resulting SDS discrete kernels are shown in FIG. 1 and discussed below. For example, $D_{xx}[u]$ corresponds to an (unscaled) central-difference approximation of the second derivative $u_{xx}$ at every pixel. Similarly, $D_{yy}[u]$ corresponds to a central different approximation of $u_{yy}$ and the mixed partial $D_{xy}[u]$ to $u_{xy}$. The resulting SDS kernels are mathematically given by:

$$(D_{xx}[u])_{i,j} = u_{i-1,j} + 2u_{i,j} - u_{i+1,j},$$

$$(D_{yy}[u])_{i,j} = -u_{i,j-1} + 2u_{i,j} - u_{i,j+1},$$

$$(D_{xy}[u])_{i,j} = u_{i,j} - u_{i+1,j} - u_{i,j+1} + u_{i+1,j+1}.$$

Resulting discrete SDS kernels are shown in the example pixel grid 100 of FIG. 1. For the sake of discussion, the pixel grid 100 may be considered all or part of a pixel grid that includes individual pixels that may represent an image. Individual pixels of the pixel grid 100 are illustrated here as black dots, or as individual example weighting values (i.e., weight) with respect to kernels.

Here, FIG. 1 includes an example SDS kernel 102. Note that the SDS kernel 102 includes a local grouping of three individual adjacent pixels arranged along the x axis of the pixel grid 100. Each of the pixels of the SDS kernel 102 is represented by a weight associated with the definition of SDS kernel 102 (e.g., −1 for the pixel to the left, +2 for the pixel in the middle, and −1 for the pixel to the right). Note that here the weighted combination of the three successive pixels (i.e., −1, +2, and −1) equals zero. Thus the SD in the horizontal direction for SDS kernel 102 (as represented in the HOLSIF) is zero.

FIG. 1 also includes an example linear SDS kernel 104 with three individual adjacent pixels arranged along the y axis of the pixel grid 100, and an example planar SDS kernel 106 with four pixels arranged in a plane defined by the x and y axes. Each of the pixels of the SDS kernels 102, 104, and 106 is also represented by a corresponding weight. For SDS kernel 104 for example, note that here the weighted combination of the 3 successive pixels (i.e., −1, +2, and −1) equals zero. Thus the SD in the vertical direction for SDS kernel 104 (as represented in the HOLSIF) is zero.

In addition, an example compound SDS kernel 108 is shown that includes multiple overlapping linear and planar SDS kernels. For ease of explanation, compound SDS kernel 108 is also shown in greater detail in an enlarged view at 109. Note that as shown in the enlarged view 109, each pixel in the SDS kernel 108 is represented by a weight. Note that here, pixel 110 is represented in a bi-harmonic condition since the weighted sum of all of its overlapping SDS kernels (4 purple and 4 green) is zero (i.e., evaluates to zero).

In operation, the example SD function $$\min_u \sum_{i,j} (D_{xx}^2[u])_{i,j} + 2(D_{xy}^2[u])_{i,j} + (D_{yy}^2[u])_{i,j}$$

can be minimized $$(\min_u)$$

by setting the partial derivative with respect to each pixel $u_{i,j}$ (e.g., pixel 110 in FIG. 1) to zero, resulting in the discretized bi-harmonic condition $\Delta^2 u=0$.

In at least one embodiment, the FD term of the HOLSIF can be represented as a membrane-like FD interpolating objective that may be discretized into the HOLSIF. An example of an FD interpolating objective is given by the following FD function:

$$\min_u \sum_{i,j} (D_x^2[u])_{i,j} + (D_y^2[u])_{i,j}.$$

where i indexes pixel columns in the pixel grid (i.e., pixels along the x axis) and j indexes pixel rows in the pixel grid (i.e., pixels along the y axis).

Examples of resulting basic discrete FD kernels are shown in FIGS. 1 at 112, 114, and 116. Note that in this example, individual pixels in each illustrated FD kernel 112 and 114 are each represented by a corresponding weight. Also note that each kernel of FD kernel 116 is also represented by a corresponding weight, with pixel 117 being represented in a harmonic condition since the weighted sum of the FD kernel 116 is zero (i.e., evaluates to zero).

Recall from above that GFD kernels may be defined. Consider, for example, a GFD that includes a triplet of three pixels. A linear first-derivative constraint can be introduced for the three pixels by penalizing non-zero first-derivatives associated with each pixel in a direction I from the GFD. In at least one embodiment, the direction i can be anisotropically controlled by attributing weights corresponding to the two-dimensional coefficients (i.e., the x and y coordinates) to the unit tangent vector to a curve corresponding to the GFD kernel (e.g., to a curve that the GFD kernel overlaps). In other words, by constraining the first-derivatives in the particular direction rather than equally in all directions from the GFD kernel, the GFD kernel can be anisotropically controlled.

FIG. 1 includes an example GFD kernel 118. In this example, a linear zero FD constraint is introduced with respect to the GFD kernel 118 in a non-axis aligned direction $\hat{t}=(\hat{t}_x, \hat{t}_y)$, as indicated by an arrow 120. The GFD kernel 118 can thus be considered an FD $D_{\hat{t}}$ kernel that can impose FD constraints (e.g., zero FD constraints) in one or more directions (e.g., $D_{\hat{t}}$ penalties) with a smoothness objective of $D_{\hat{t}}^2$. The smoothness objective $D_{\hat{t}}^2$ penalizes, and thus constrains, the non-zero FD in the non-axis aligned direction $\hat{t}=(\hat{t}_x, \hat{t}_y)$. Note that here, a non-zero FD in the orthogonal direction $\hat{t}^\perp=(-\hat{t}_y, \hat{t}_x)$ is not constrained (i.e., is left unconstrained) by the smoothness objective. Note that in this example, each of the pixels in the GFD kernel 116 are represented with a directional component $-t_x$, $-t_y$, or $-t_x-t_y$.

Let $P=\{x_k, y_k, v_k\}$ denote a set of color value constraints P with individual color values v for individual coordinates (x, y) indexed by k—where $u(x_k, y_k)$ is desired to attain the value $v_k$.

In at least some embodiments, the smoothness penalties described above, and the constraint term, can be pursued for a set of pixel color values $u_{i,j}$:

$$E(u) = w_2 \Big( \sum (D_{xx}[u])^2 + 2 \sum (D_{xy}[u])^2 + \sum (D_{yy}[u])^2 \Big) +$$
$$w_1 \Big( \sum (D_x[u])^2 + \sum (D_y[u])^2 \Big) + w_0 \Big( \sum (u)^2 \Big) +$$
$$w_i \Big( \sum (D_i[u])^2 \Big) + w_p \Big( \sum (u(x_k, y_k) - v_k)^2 \Big)$$
$$= \|Lu - c\|^2,$$

where L is a sparse rectangular matrix and E(u) represents the quadratic energy for all color values u in the pixel grid. In this example, coefficients of this least squares function can be spatially uniform and based on SDS kernels, except where color value constraints and/or derivative discontinuities are introduced that add, omit, and/or reweight individual terms.

Minimizing the quadratic energy E(u) may be considered similar or equivalent to solving the symmetric linear system $L^T L u = L^T c$, denoted Au=b, where u the set of individual color values to be solved for, c represents derivative constraints (zero for individual pixels not associated with a constraint), and L represents a linear operator (i.e., weights on individual pixels) associated with defining the objective of the symmetric linear system. In other words, by minimizing the quadratic functional $(u) = \|Lu - c\|^2$, the linear system can solve $L^T L u = L^T c$.

In at least one embodiment, traditional raster scan pixel ordering can be used to interpolate color values to individual pixels in a pixel grid. Consider, for example, matrix A that represents some or all of the pixels in a two-dimensional pixel grid. In this example, the matrix A may be sparse with comparatively more non-zero coefficients (e.g., thirteen non-zero coefficients) as compared to the number of non-zero coefficients available with traditional systems, such as Laplacian-based systems for instance (e.g., five non-zero coefficients). In some circumstances the matrix A may also block pentadiagonally with a span of $\pm 2n_x$ non-zero elements (coefficients)

away from the diagonal, where $n_x$ is the image resolution in x. This compares to block tridiagonal and a diagonal span of $\pm n_x$ for the Laplacian case.

Features Generally

Recall that features can be defined that specify color value constraints for individual pixels in a pixel grid and/or that constrain derivatives associated with interpolating color values to individual pixels. Examples described above include points and curves, either of which may be rasterized into the pixel grid to define all or part of a VG image.

Before discussing points and curves in greater detail, it is helpful to note that both of these types of features can be associated with a wide variety of attribute types. For example, both points and curves may specify a color value(s), and certain curves may also constrain derivatives associated with interpolating color values to individual pixels. In addition, a number of other types of attributes are possible as well. For example, as described above, a curve may have an attribute(s) that causes SDS kernels to be removed along the curve and/or GFD kernels to be added along the curve. As another example, the placement and/or size of a curve or a point in the pixel grid may be considered an attribute(s) of that curve or point, respectively.

Feature Types: Points

In accordance with the described techniques, at least two types of points, namely point value (PV) points and critical points, may be defined, and thus created by a user. In at least one embodiment, a PV point may be created by the user in a continuous location with respect to the image somewhere between adjacent pixels (e.g., four adjacent pixels), and may impose a color value constraint for the continuous location. In at least one embodiment, the color value constraint can be imposed for the continuous location by weighting the adjacent pixels to approximate the continuous position—thus yielding an objective term of the form:

$$(w_{o,o}u_{i,j} + w_{1,0}u_{i+1,j} + w_{0,1}u_{i,j+1} + w_{1,1}u_{i+1,j+1} - v)^2$$

A critical point, in turn, may impose $D_i$ penalties in all directions around adjacent pixel(s) (e.g., four adjacent pixels)—thus constraining the color values of the adjacent pixels to be equal.

Figure 2A:
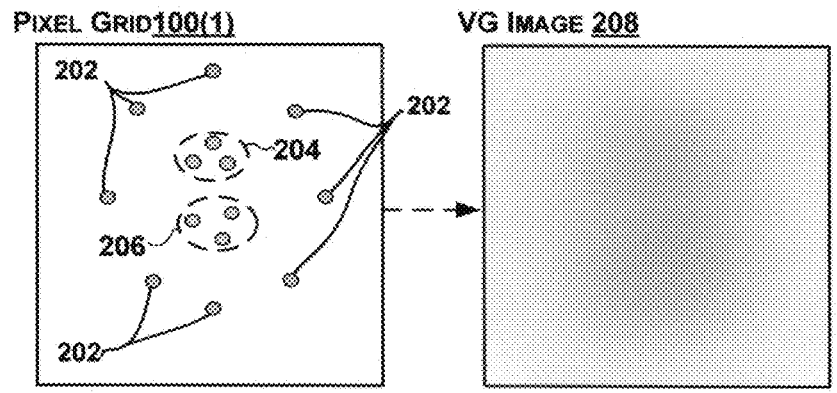
FIGS. 2A-2C illustrate an example VG tool environment 200 in which the described TPS-based interpolation techniques may be implemented, in accordance with at least one embodiment.

Consider, for instance, FIG. 2A which illustrates a VG tool environment 200 in which the described TPS-based interpolation techniques can be implemented. In this example, FIG. 2 includes an instance of the pixel grid 100, shown as a pixel grid 100(1). For the sake of illustrative clarity, individual pixels of the pixel grid 100(1) are not illustrated. However, eight PV points 202 are shown in the pixel grid 100(1) that have been sketched by a user.

Note that each of the PV points 202 specify a color value associated with a blue color appearance (i.e., a blue color value). Accordingly, each PV point 202 may impose a blue color value for a continuous location somewhere between adjacent pixels. Similarly, note that the user has also sketched three PV points 204 that specify a red color value and three PV points 206 that specify a green color value.

As explained above, by utilizing the described TPS-based interpolation techniques, a HOLSIF can be solved for a set of individual color values that can be interpolated to individual pixels of the pixel grid 100(1). Thus, individual pixels in the grid 100(1) that have not been explicitly assigned a color value and/or subjected to a derivative constraint by the PV points 202, 204, or 206 can be assigned respective color values. In other words, individual color values can be interpolated to pixels that have not had a constraint explicitly imposed on them by the PV points 202, 204, or 206. Furthermore, these individually assigned color values can be based on the constraints (e.g., color values) imposed for the target kernels of PV points 202, 204, and 206.

Accordingly, FIG. 2A also includes an example VG image 208 that may be rendered by utilizing the described TPS-based interpolation techniques based on the constraints imposed by each of the PV points 202, 204, and 206. Note that VG image 208 includes red, green, and blue color values that have been interpolated to the pixels of the pixel grid 100(1) in a smooth continuous fashion based on the PV points 202, 204, and 206. Missing are the typical "tent-like" contrasting, unnatural appearing color discontinuities around the PV points that \would be expected by utilizing typical interpolation techniques, such as Laplacian-based diffusion for instance.

Figure 2B:
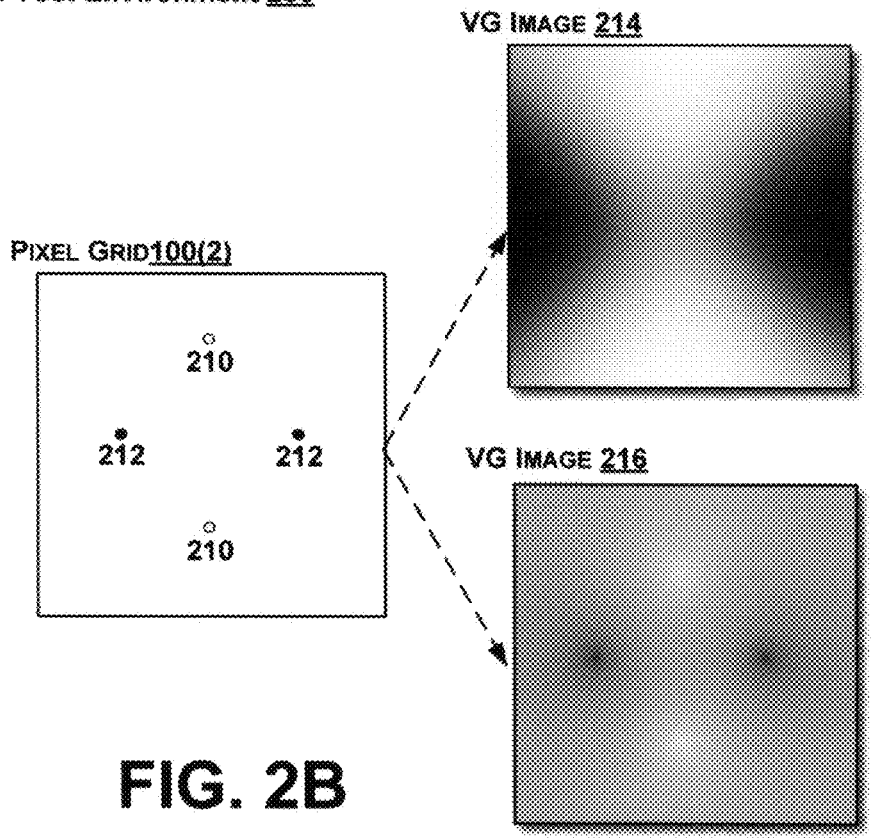

To assist the reader in appreciating the advantages of utilizing the described TPS-based interpolation techniques, FIG. 2B includes another instance of the pixel grid 100, shown as a pixel grid 100(2), that may be implemented in the VG tool environment 200. Note that for the sake of illustrative clarity, individual pixels of the pixel grid 100(2) are not illustrated. However, note that here the user has sketched two PV points 210 that specify a light grey color value and two other points 212 that specify a comparatively darker grey color value.

FIG. 2B includes an example VG image 214 that may be rendered by utilizing the described TPS-based interpolation techniques based on the constraints imposed by each of the PV points 210 and 212. Note that the VG image 214 includes various grey color values that have been interpolated to the pixels of the pixel grid 100(2) in a smooth continuous fashion based on the PV points 210 and 212. In contrast, FIG. 2B also includes an example VG image 216 that may be rendered by utilizing a Laplacian-based diffusion technique. Note that in this image, unnatural "tent-like" features are visible that correlate with each of the PV points 210 and 212. Furthermore, also note that the grey color values diffused to the pixels of the pixel grid 100(2) are not distributed in a smooth continuous fashion.

Feature Types: Curves

Curves may be defined, such as the various types of curves described above, that specify color value constraints for individual pixels in a pixel grid and/or that constrain derivatives associated with interpolating color values to individual pixels of the pixel grid.

In at least some embodiments, curves may be rasterized into the pixel grid by computing their intersections with pixel grid edges and inserting new constraint penalties or adjusting smoothness penalties at the computed intersections. Such intersections may be computed for quadratic B-splines by solving a quadratic equation. The description below describes examples of how each of the curve types described above may be implemented.

Value Curves (V):

recall that a value curve can impose an affine linear color value constraint for nearby (e.g., the two nearest) pixels at each intersection between the value curve and the pixel grid. As a result, the color value can be specified for pixels along the length of the value curve (i.e., for pixels included in the value curve) and a smooth color blending can be achieved with respect to other pixels near, but not included in, the value curve. In referring to a value curve as a type of curve, the shorthand denotation "V" may be used herein.

Figure 2C:
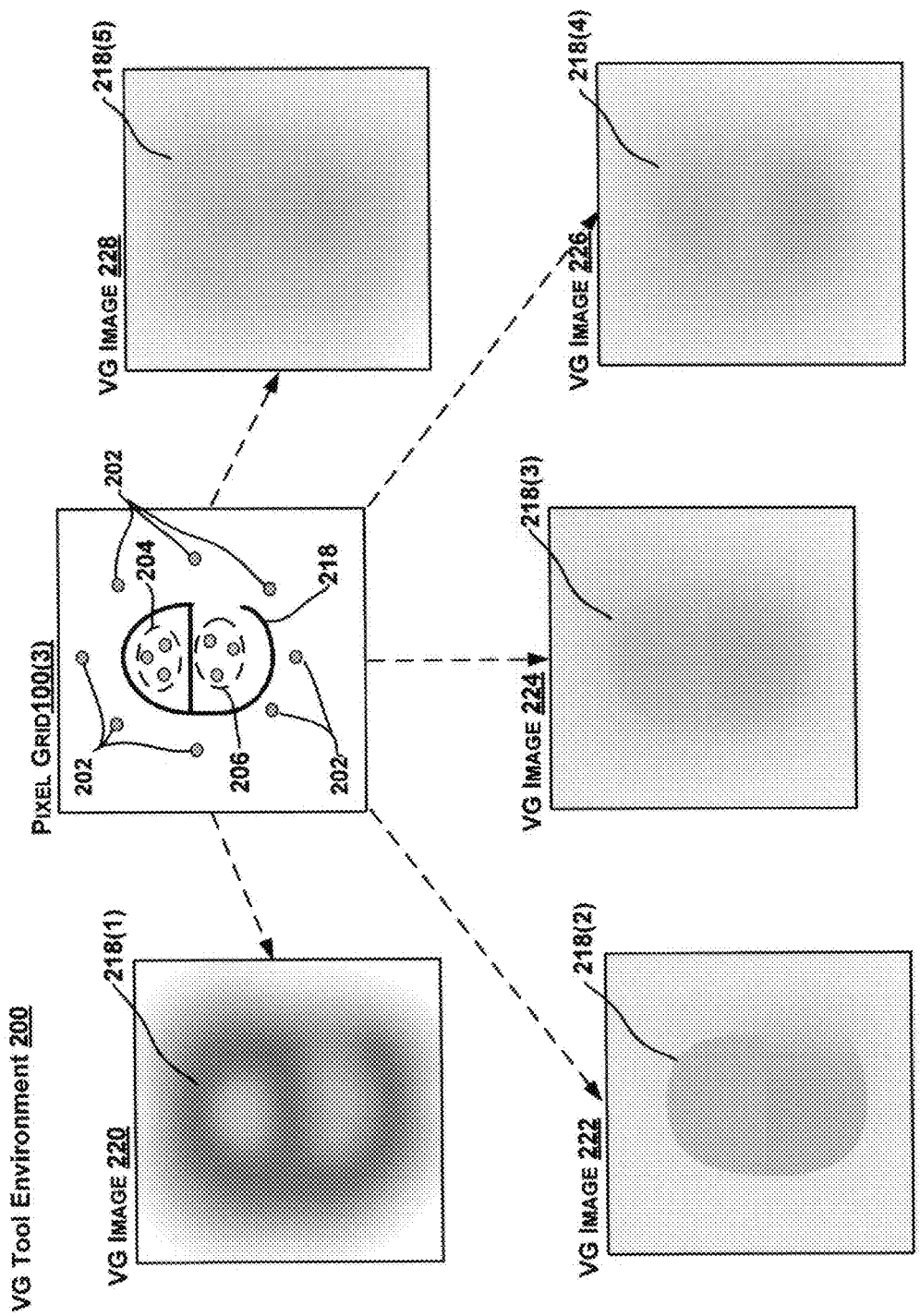

To provide a practical example of the effect that may be caused by creating a value curve in a pixel grid, consider FIG. 2C. FIG. 2C includes another instance of the pixel grid 100, shown as a pixel grid 100(3), that may be implemented in the VG tool environment 200. Note that for the sake of illustrative clarity, individual pixels of the pixel grid 100(3) are not illustrated. Also note that pixel grid 100(3) includes the same PV points 202, 204, and 206 that were discussed with respect to pixel grid 100(1) above. More particularly, in this example, the user has sketched eight PV points 202 that specify a blue color value, three PV points 204 that specify a red color value, and three PV points 206 that specify a green color value.

In addition to the PV points discussed above, note that the user has also sketched a curve 218 in the pixel grid 100(3). The shape of the curve 218 resembles the shape "e", and thus includes a top portion that surrounds, and thus encloses, the three PV points 204. In addition, the curve 218 includes a bottom portion that partially surrounds, but does not completely enclose, the three PV points 206.

For the sake of discussion, now assume that in this example, the curve 218 is a value curve that imposes an affine color value constraint for the two nearest pixels at each intersection between the curve 218 and the pixel grid 100(3). Accordingly, FIG. 2C includes an example VG image 220 that may be created as a result of the curve 218 being sketched as a value curve 218(1) in the pixel grid 100(3) in accordance with the described interpolation techniques. As shown in the VG image 220, the color value specified by the value curve 218(1) is a relatively dark color value. However, note that this dark color value along the value curve 218(1) is smoothly blended with other pixels near, but not included in, the value curve 218(1).

Tear Curves (T):

recall that a tear curve can cause SDS kernels that straddle the tear curve in the pixel grid to be removed. In other words, a tear curve can remove $D_{xx}$, $D_{yy}$, $D_{xy}$ smoothness penalties of SDS kernels that overlap the tear curve. As a result, the pixels that were included in the removed SDS kernels are no longer subjected to the SDS penalties of the HOLSIF. Tear curves thus introduce discontinuities into the pixel grid since color values between pixels on different sides of a tear curve may break discontinuously in an unsmooth fashion. In referring to a tear curve as a type of curve, the shorthand denotation "T" may be used herein.

Figure 3:
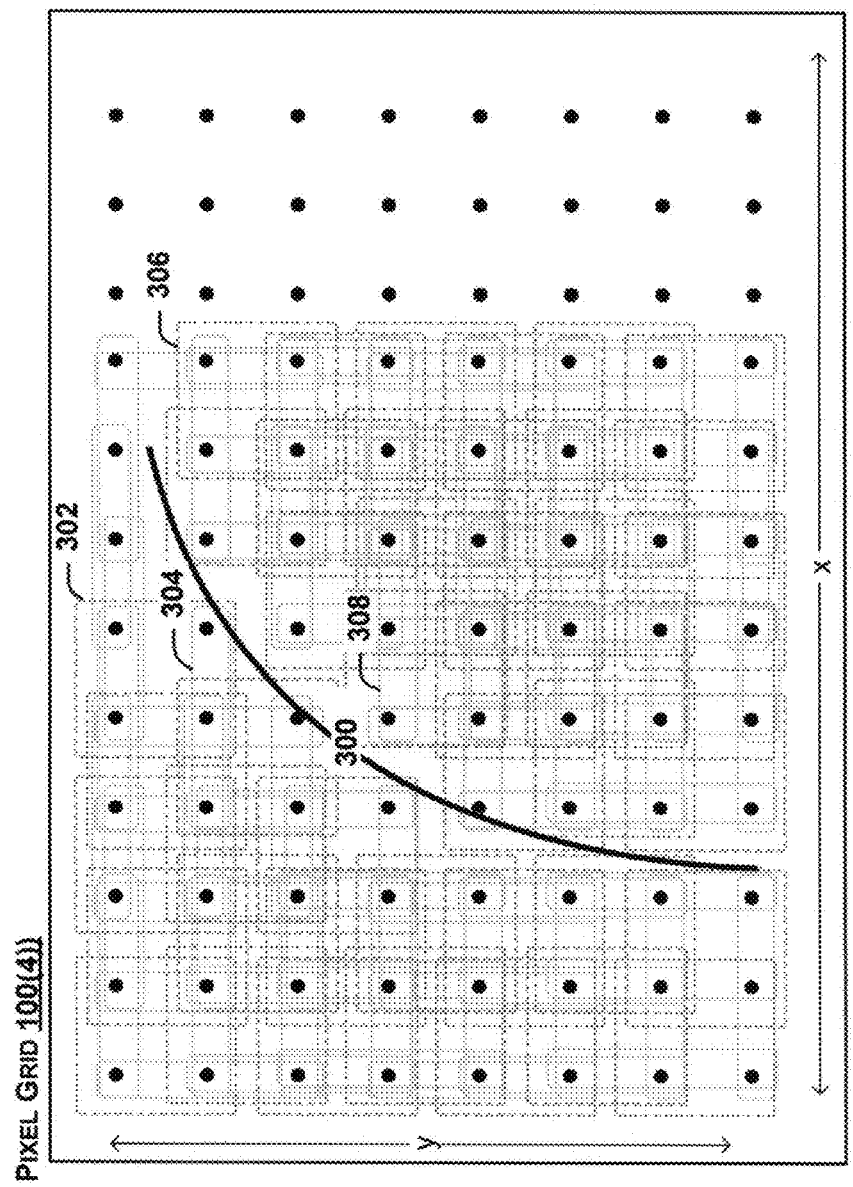
FIGS. 3-4 illustrate an example pixel grid in which the described TPS-based interpolation techniques may be implemented, in accordance with at least one embodiment.

One example of all or part of a tear curve is illustrated as tear curve 300 in FIG. 3. Here, the tear curve 300 is shown in the context of SDS kernels that may be identified in another instance of the pixel grid 100, shown as a pixel grid 100(4). Note that SDS kernels that overlap with the tear curve 300, such as SDS kernel 302 (a compound SDS kernel) and SDS kernel 304 for instance, may be removed from the pixel grid 100 such that those pixels that were included in the SDS kernels 302 and/or 304 are no longer subjected to SDS smoothness penalties. Also note that in this example SDS kernels that do not overlap with the tear curve 300, such as SDS kernels 306 and 308 for instance, are not removed from the pixel grid 100(4). As such, pixels included in the SDS kernels 306 and 308 can continue to be subjected to SDS smoothness penalties.

To provide a practical example of the effect that may be caused by creating a tear curve in a pixel grid, again consider FIG. 2C. Recall that as shown in FIG. 2C, in addition to sketching the PV points 202, 204, and 206, the user has also sketched a curve 218 in the pixel grid 100(3). The shape of the curve 218 includes a top portion that encloses the three PV points 204 and a bottom portion that partially surrounds the three PV points 206.

For the sake of discussion, now assume that the curve 218 is a tear curve that causes SDS kernels overlapping the crease curve to be removed from the pixel grid 100(3). Accordingly, FIG. 2C also includes an example VG image 222 that may be rendered as a result of the curve 218 being sketched in accordance with the described interpolation techniques. Note that the curve 218 is represented in the VG image 222 as an example tear curve 218(2).

As shown in the VG image 222, the red color value specified by the PV points 204 has been interpolated to the individual pixels enclosed within the upper portion of the tear curve 218(2) in a continuous manner. As a result, the upper portion is shown as having a constant color that is the red color value. The red color is broken (becomes discontinuous) at pixels that are included in the tear curve. In other words, the red color value has been extrapolated to the edge of the enclosed region where the tear curve is located.

As also shown in the VG image 222, the green color value specified by the PV points 206 has been interpolated to those individual pixels in the lower portion that are partially enclosed by the tear curve 218(2) in a continuous manner. In other words, the green color value has been extrapolated to the edge of the partially enclosed region in the lower portion. However, the green color is smoothly blended with the blue color value (specified by the PV points 202) along the pixels that approach the open, non-enclosed, region of the lower portion.

Crease Curves (C):

recall that a crease curve can remove SDS kernels that overlap with the crease curve in the pixel grid (in a manner similar to tear curves) and form GFD kernels to be added into the pixel grid along the crease curve. Each GFD kernel along the crease curve can subject its pixels to GFD smoothness penalties across the curve in a direction $\hat{t}^\perp$ normal to the crease curve in the pixel grid. As explained above, in at least one embodiment, this can be accomplished by assigning weights to individual pixels of each GFD kernel to ensure that non-zero first-derivatives are penalized in the $\hat{t}^\perp$. In referring to a crease curve as a type of curve, the shorthand denotation "C" may be used herein.

Figure 4:
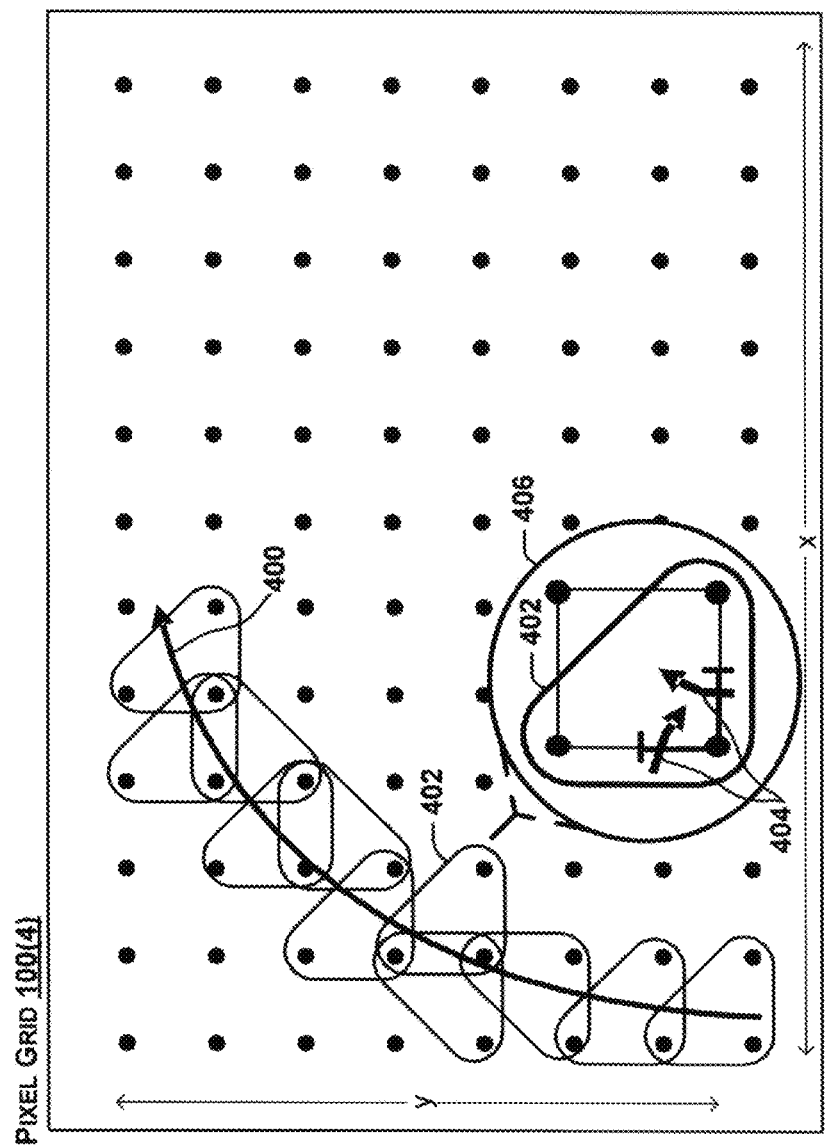

One example of all or part of a crease curve is illustrated as crease curve 400 in FIG. 4. Here, the crease curve 400 is shown in the context of SDS kernels that may be identified in pixel grid 100(4). Assume here that any SDS kernels that may have overlapped the crease curve 400 have been removed. Furthermore, note that a number of GFD kernels have been formed along the crease curve 400. Each of the GFD kernels, which may be designated as generalized $D_t^\perp$ kernels, overlap the crease curve 400.

For example, note that a GFD kernel 402 may be formed to include three pixels when the crease curve 400 passes through either of the two half-edges (two examples represented here by arrows 404) nearest a particular pixel forming the corner pixel of the GFD kernel 402. Note that for ease of explanation, the GFD kernel 402 is shown in greater detail in an enlarged view at 406.

To provide a practical example of the effect that may be caused by creating a crease curve in a pixel grid, again consider FIG. 2C. For the sake of discussion, now assume that the curve 218 is a crease curve that causes SDS kernels overlapping the crease curve to be removed from the pixel grid 100(3) and GFD kernels to be formed along the crease curve. Accordingly, FIG. 2C includes an example VG image 224 that may be rendered as a result of the curve 218 being sketched as a crease curve 218(3) in the pixel grid 100(3) in accordance with the described interpolation techniques.

As shown in the VG image 224, color values are smooth along the tangent of the crease curve 218(3) and across the crease curve 218(3) in a direction normal to the crease curve 218(3). Furthermore, note that there are no visible derivative discontinuities across the normal direction since non-zero first-derivatives are penalized in that direction. However, there may be derivative discontinuities along the tangent of the crease curve 218(3) since non-zero first-derivatives are not penalized in that direction. Thus, some visual sharpness, or distinctiveness, of the crease curve 218(3) can be maintained.

Contour Curves (N):

recall that like a crease curve, a contour curve can introduce GFD kernels along the contour curve. However, unlike a crease curve, a contour curve does not remove SDS kernels that overlap the contour curve. Each of the introduced GFD kernels can impose first-derivative penalties along F, the tangent vector to the contour curve. These GFD kernels can thus be designated as generalized $D_{\hat{t}}$ kernels. In referring to a contour curve as a type of curve, the shorthand denotation "N" may be used herein.

As explained above, GFD kernels can be anisotropically controlled to impose first-derivative penalties along $\hat{t}$ by assigning weights to individual pixels of each GFD kernel to ensure that non-zero first-derivatives are penalized in that direction. As a result of penalizing non-zero first-derivatives along $\hat{t}$, a single color value associated with a low (e.g., the lowest) quadratic energy can be attributed to the pixels along the contour curve.

To provide a practical example of the effect that may be caused by creating a contour curve in a pixel grid, consider FIG. 2C. For the sake of discussion, now assume that the curve 218 is a contour curve that causes GFD kernels to be formed along the contour curve. Accordingly, FIG. 2C includes an example VG image 226 that may be rendered as a result of the curve 218 being sketched as a contour curve 218(4) in the pixel grid 100(3) by utilizing the described interpolation techniques.

As shown in the VG image 226, an unspecified single color value associated with an enhanced image smoothness has been attributed to the contour curve 218(4) as a result of non-zero first-derivatives being penalized along the tangent vector to the contour curve 218(4) where the contour curve 218(4) intersects the pixel grid 100(3). Note that due to the second-derivative generalized TPS smoothness objective of the SDS kernels along the contour curve 218(4), the single color smoothly blends with other pixels in the image.

Slope Curves (S):

recall that like a contour curve, a slope curve can introduce GFD kernels along the slope curve. Also, a contour curve does not remove SDS kernels that overlap the contour curve. Unlike contour curves however, each introduced GFD kernel can be anisotropically controlled to impose first-derivative penalties along $\hat{t}^{\perp}$, the direction normal to the contour curve. Each of the introduced GFD kernels can be anisotropically controlled by assigning weights to individual pixels of each GFD kernel to ensure that non-zero first-derivatives are penalized in the direction $\hat{t}^{\perp}$. In referring to a slope curve as a type of curve, the shorthand denotation "S" may be periodically used herein.

To provide a practical example of the effect that may be caused by creating a slope curve in a pixel grid, consider FIG. 2C. For the sake of discussion, now assume that the curve 218 is a slope curve that causes GFD kernels to be formed along the slope curve. Accordingly, FIG. 2C includes an example VG image 228 that may be rendered as a result of the curve 218 being sketched as a slope curve 218(5) in the pixel grid 100(3) by utilizing the described interpolation techniques.

Feature Types: Compound Curves

In at least one embodiment, various types of compound curves that include multiple individual curves of the same and/or different type may be defined. A compound curve can include two or more individual curves of any type or types. For example, two or more of the curve types described above can be combined to define a compound curve. As a result, a user can cause multiple individual curves to be created in the pixel grid simply by sketching or selecting a single compound curve.

A particular compound curve type may be designated by each of the individual curve types that it includes. For the sake of clarity, the shorthand denotations for each of the curve types described above (V, T, C, N, and S) will be used herein to designate a particular compound curve type. For example, a compound curve that includes a tear curve next to a value curve may be designated as TV.

Individual curves that make up a compound curve may be positioned in any order with respect to one another. Accordingly, the shorthand denotation can list each of the curves of a compound curve in a sequence that corresponds to how each curve is juxtaposed in the compound curve (e.g., TV is different from VT). Furthermore, each individual curve may be offset (i.e., separated) from another adjacent curve in the pixel grid by an offset distance τ. The offset distance τ between two adjacent curves may be any suitable distance, such as an infinitesimal distance (to juxtapose the resulting curves in a VG image) or a larger non-infinitesimal distance (to produce a comparatively wider effect in a VG image).

For adjacent curves in a compound curve that are not offset from one another by a non-infinitesimal τ, a comma may be used in the shorthand denotation for that compound curve. For example, if a V curve and a T curve form a compound curve and are offset from one another by a non-infinitesimal τ, the shorthand denotation V,T may be used. Alternatively, if the V and T curve are offset from one another by an infinitesimal distance, the shorthand denotation VT may be used.

Table 1 below lists some example compound curve types that might be defined in accordance with the described TPS-based interpolation techniques. It is to be appreciated and understood that the compound curve types listed in Table 1 represent only some of the possible compound curve types that may be defined by virtue of implementing the described techniques. Additionally, FIG. 5 includes example VG images that illustrate the effects that might be provided by each of the example compound curve types listed in Table 1 when sketched in the context of the VG tool environment 200 described above.

TABLE 1

| Compound Curve Type | Expansion | VG Image |
|---|---|---|
| Two-sided Value | $V_1TV_2$ | 502 |
| Single-sided Value | TV | 504 |
| Creased-Value | VTV | 506 |
| Wide creased-Value | C, V | 508 |
| Creased Contour | CN | 510 |
| Wide Contour | N, N | 512 |
| Zero Derivative | NS | 514 |
| Leveled Tear | N, T, N | 516 |
| Stroke | T, V, T | 518 |
| Creased Stroke | C, V, C | 520 |
| Ridge/Valley | VS | 522 |
| Plateau | CV, CV | 524 |
| Wide Tear | $V_1$, C, $V_2$ | 526 |

Figure 5:
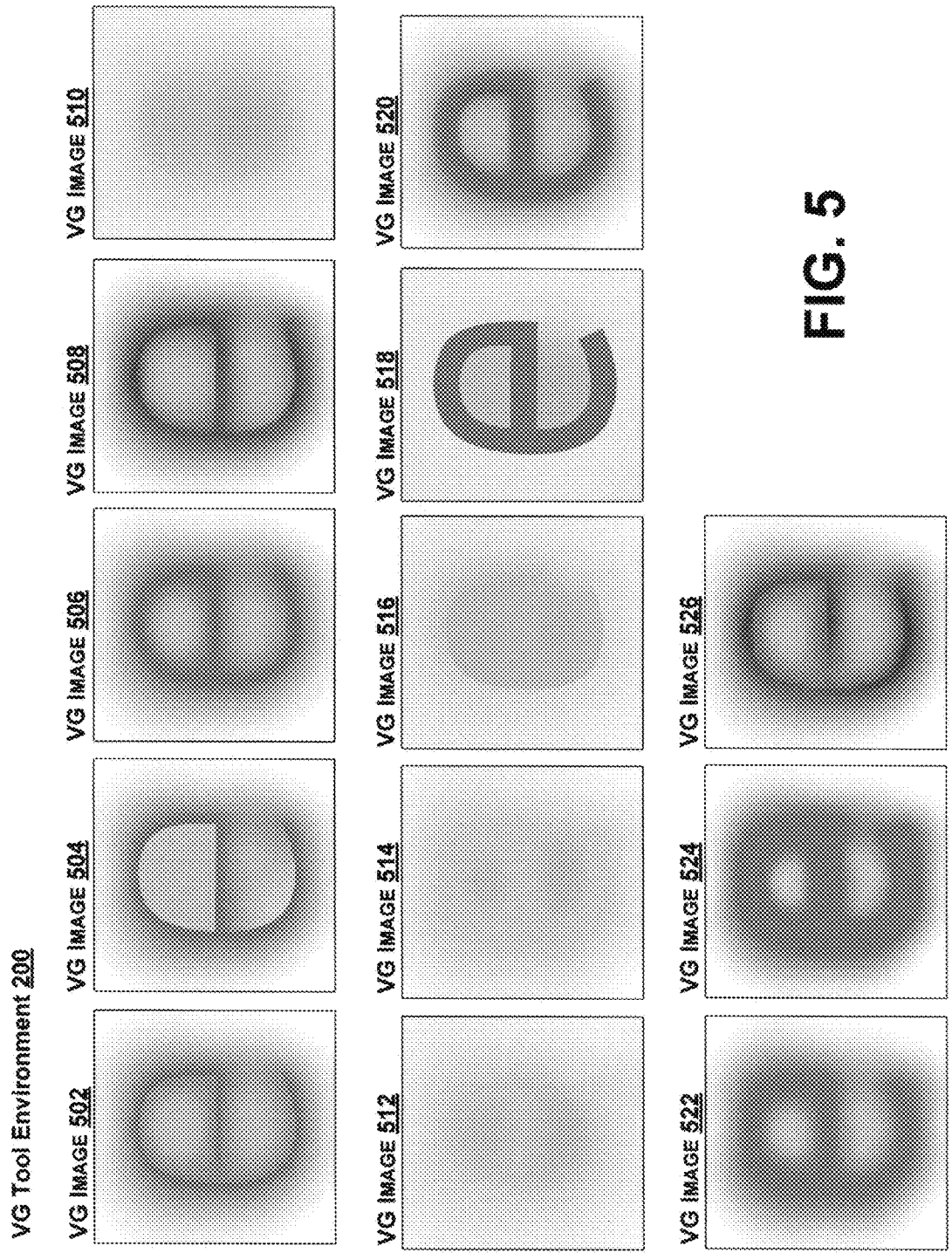
FIG. 5 illustrates an example VG tool environment in which the described TPS-based interpolation techniques may be implemented, in accordance with at least one embodiment.

Note that for each listed compound curve, Table 1. includes a column entitled "Compound Curve Type" which includes a type name that may be designated to each compound curve and a column entitled "Expansion" which describes each listed compound curve in accordance with the shorthand denotations described above. In addition, for each listed compound curve, Table 1 includes a column entitled "VG Image"

that references the particular corresponding VG image for that listed compound curve in FIG. 5.

Note that because a curve may not be closed under one or more offsets, in at least one embodiment, an approximation can be made by offsetting control points in a particular curve. For curves that bend significantly in a single quadratic segment, knot insertion can be applied to subdivide the curve to have more segments/control points while retaining the same shape of the curve.

Example Solution

In at least one embodiment, given a system scalar matrix A, a set of color values to be solved for (at all pixels in the pixel grid) u and vector b, a single coarse-to-fine multi-grid pass approach can be utilized to solve the linear system Au=b. This linear system may result, for example, from the TPS smoothness objective and any added point and curve features.

Low-Resolution Solvers:

in operation, a coarse-level solver may be implemented that uses a sparse conjugate gradient (CG). Alternatively or additionally, a direct linear solver may be implemented based on banded-diagonal Cholesky decomposition (CD) which may exploit the symmetry of A. In some circumstances, this CD-based direct linear solver may outperform the coarse-level solver in both speed and accuracy. Unfortunately, in under-constrained systems (such as a tear-bounded region containing fewer than three point value constraints), this CD-based direct linear solver may resolve indeterminacy less intuitively than the CG-based coarse-level solver does.

Various regularizing functions may be possible. In at least one embodiment, A can be added to the identity matrix times a small weight. This addition can make the solution tend slightly to zero—away from the color value constraints. Alternatively or additionally, a first-derivative based membrane functional may be utilized that can leave a solution under-constrained in tear-bounded regions without color value constraints. The CG-based coarse-level solver may resolve indeterminacy based on an initial image input to the iteration. In at least one embodiment, a Laplacian smoothness objective can use resulting output to initialize a final TPS-based solution. Thus, a tear-bounded region containing a single value constraint may yield a result associated with a smooth naturally appearing continuous color continuum.

Multi-Grid Relaxation:

in some circumstances, neither the CG-based coarse-level solver nor the CD-based direct linear solver described above may be fast enough to be utilized at higher resolutions. Accordingly, in at least one embodiment, an approach can be implemented that invokes a base solver (CG or CD) at an image pixel resolution of roughly 32×32 (for CG-based resolution) up to a pixel resolution 128×128 (for CD-based resolution). Furthermore, this resolution can extend the solution using a coarse-to-fine multi-grid scheme. More particularly, each multi-grid level may halve the linear distance between individual image samples. The computation may incrementally upsample the solution to the next finer level and perform one or more Gauss-Seidel (GS) iterations (e.g., by utilizing a GS-based solver) on the linear system obtained from rasterizing at that level.

Discontinuity-Aware Upsampling:

in at least one embodiment, in smooth areas a biquadratic upsampling (e.g., with weights $\frac{1}{16}$, $\frac{3}{16}$, $\frac{3}{16}$, $\frac{9}{16}$ on the four nearest parent pixels) can be used. For example, for accurate upsampling near tear curves, a determination can be made if the segment between a finer-level pixel and each of that finer-level pixel's four parent pixels intersects any tear curve. If the segment intersects a tear curve(s), that parent's contribution in the upsampling can be omitted.

Viewport Solution:

in some circumstances, continuous panning and zooming of a limited viewport in a pixel grid may be desirable. Accordingly, to allow for such panning and zooming, features lying outside of the limited viewpoint may be accounted for. In at least one embodiment, a viewpoint boundary can be assigned so called "Dirichlet" conditions taken from a coarse solution spanning a fixed canvas. A virtual canvas of significant (e.g., infinite) extent can be supported in the context of the pixel grid by utilizing the multi-grid solver. This can be achieved in the multi-grid solver by forming windows of progressively coarser sampling and larger extent until all image features in the pixel grid are contained (i.e., until a bounding box around all the image features fits in the viewport).

In addition to initializing each window's solution by upsampling, each window's solution may fix a two-pixel band around the next-finer window's boundary. This may serve to essentially define Cauchy boundary conditions for the bilaplacian. The coarsest window, and any finer window still containing all features, may apply natural-appearing boundary conditions, equivalent to a tear circumscribing the entire boundary of the solution domain over which the set of color values u is defined.

Scale Invariance and Objective Weighting:

in at least one embodiment, discrete kernel coefficients for smoothness and constraint terms may be scaled properly with image resolution for a VG image. For example, let $h_l$ be a sample spacing at level l (i.e. $h_l = h_l/2$). Then the weight $w_2$ of TPS smoothness objective components $D_{xx}$, $D_{xy}$, and $D_{yy}$ can be scaled by $1/h_l^2$ to account for scaling effects due to squared second-derivatives and two-dimensional integration. The discrete first-derivative kernel(s) (based on $D_x$ and $D_y$) can be scale-invariant; scaling effects of squared first derivative and two-dimensional integration may cancel out. Value and derivative constraints along a curve can be scaled by introducing unit-weighted constraints at intersections of the curve with image grid edges (i.e., with edges (in the x direction or y direction) between individual adjacent pixels of the pixel grid).

In at least one embodiment, a $w_2$ weight of $10^{-7}$ times the number of image pixels for TPS-based objective components ($D_{xx}$, $D_{yy}$, and $D_{xy}$) can be used. No (i.e., a zero) membrane objective ($w_1=0$) may be used. For features, the following can be used: a weight of 0.005 for a generalized FD smoothness objective at creases, a weight of 2.0 for derivative constraints, and a weight of 1.0 for value constraints. Pixel color values may be in the range from 0 to 1.

Example Solution Method

System Setup and Data Structures:

in at least some embodiments, at each resolution level for the image, individual curves can be traversed through. Each curve can be rasterized to create two data structures. One of the created data structures can accumulate a list of constraints from all value-curve grid intersections and isolated value points. The second created data structure can store a discontinuity map of 4 bits per pixel, indicating whether a tear or crease is present in the x and y edges emanating from that pixel. The minimum and maximum location of all tear curve intersections on each image grid edge may be stored as well.

The list of color value constraints corresponding to features of the image can be traversed using discontinuity map information to determine which pixels of the pixel grid may be included in each value kernel. For purposes of this discussion, a value kernel can be a certain weighted linear combination of pixels that can be solved for and used in a color value constraint. More particularly, a value kernel can constrain an isolated location in the pixel grid to a certain color value, or can constrain locations along an entire curve to color values that might vary along the curve. This value kernel can be squared and included in as a term (that will be summed) in accordance with the HOLSIF's smoothness objective.

For example, for a value curve, a discontinuity map can be checked to determine, for each intersected edge of a value kernel, whether that intersected edge also intersects a tear curve. For each edge that intersects a tear curve, a minimum/maximum tear location for that edge can indicate which of that edge's two pixels may be excluded from the affine color value constraint. In circumstances where both pixels may be excluded, the entire value kernel may be omitted.

As another example, for a value point at a given location, each segment joining the value point to surrounding pixels (e.g., four surrounding pixels) can be checked to determine if one or more of the surrounding pixels is intersected by a tear curve. If one of the surrounding pixels is intersected, that surrounding pixel can be removed from the bilinear objective term and the remaining pixels can be re-weighted. This might be considered similar to reweighting in "discontinuity-aware upsampling" for instance. A value kernel can be used for bilinear interpolation between the surrounding pixels to the given location.

In operation, color values may be accumulated for b and kernel weights can be accumulated for A in a sparse pixel array—which may be called a constraint value map. From the discontinuity map and constraint value map, a sparse representation of the matrix A can then be computed. By avoiding indices and storing an n×13 matrix, problems associated with the regular, two-dimensional structure can be avoided since thirteen or less pixels at known locations will have non-zero coefficients in any row of A.

Performance Enhancement (e.g., Optimization) Example:

in at least one embodiment, a system that operates on four-channel color data and leverages the vector processing of a streaming SIMD (single instruction, multiple data) extensions instruction set (SSE2) can be implemented. For example, an application programming interface (API), such as an open multi-processing API, may be utilized that parallelizes solvers (e.g., CG-based, CD-based, and GS-based solvers) on eight threads provided by two quad-core processors (i.e., central processing units (CPUs)). System setup across feature curves can also be parallelized.

TPS-based interpolation problems may have larger condition numbers than problems based solely on Laplacian-based diffusion. Achieving robust computation for TPS-based problems may thus entail, in at least some circumstances, using double-precision arithmetic when accumulating the scalar system matrix A and computing the linear system solution. The vector b can be accumulated in single precision with no effect on system stability.

Example System

Figure 6:
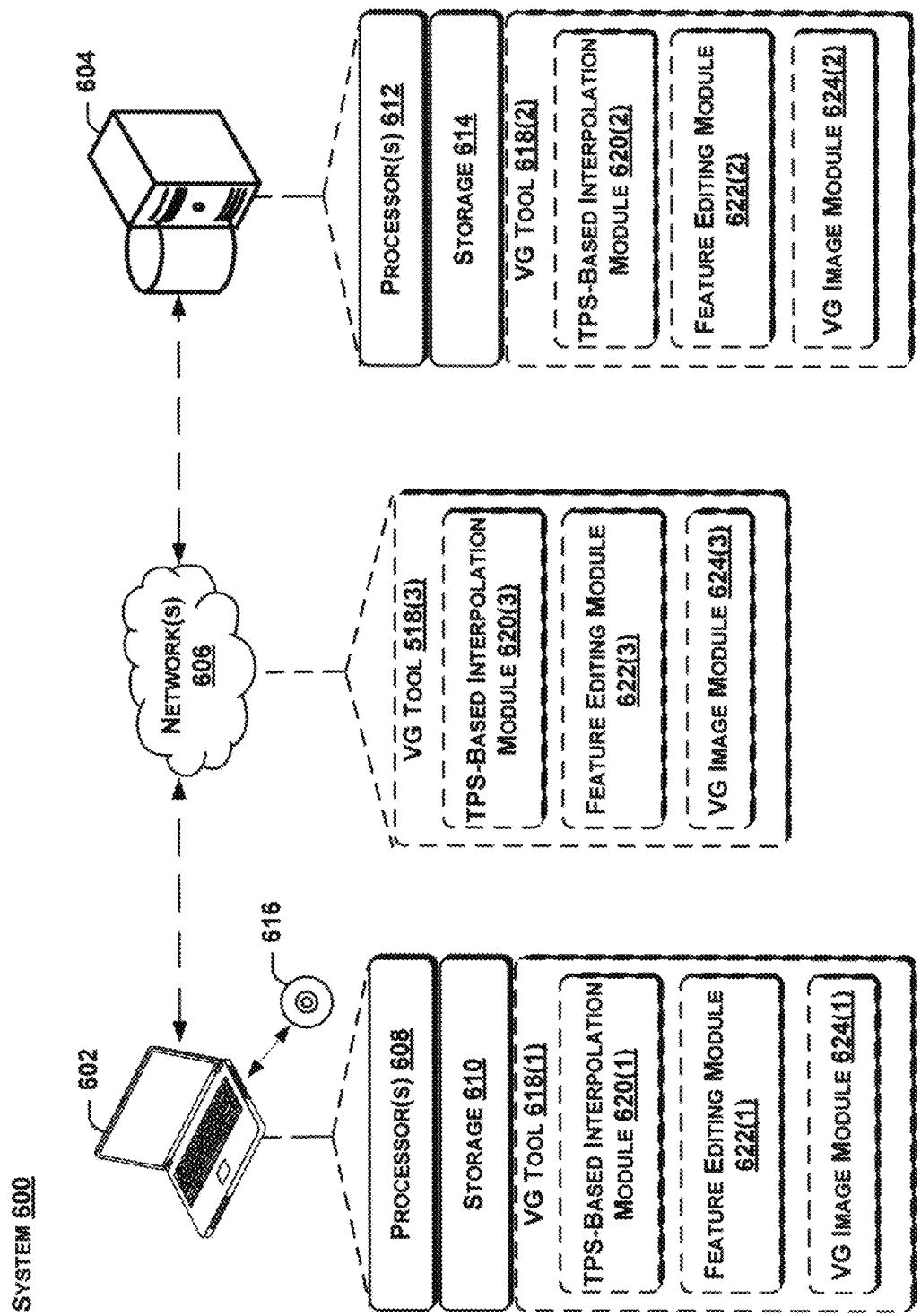
FIG. 6 illustrates a system in which the described TPS-based interpolation techniques may be implemented, in accordance with at least one embodiment.

FIG. 6 illustrates an example system 600 in which the described TPS-based interpolation techniques may be implemented, in accordance with at least one embodiment. In this example, the system 600 includes multiple computing devices, represented here as computing devices 602 and 604. These computing devices can function in a stand-alone or cooperative manner to implement the described techniques. Furthermore, in this example, the computing devices 602 and 604 can exchange data over one or more network(s) 606. Additionally, the computing device 602 and/or computing device 604 can exchange data with one or more other types of devices via network(s) 606 (e.g., via a cloud). Further, the functionality of either computing device 602 or computing device 604 may be provided by a cloud-based service. Without limitation, the network(s) 606 can include one or more local area networks (LANs), wide area networks (WANs), the Internet, and the like.

Here, computing devices 602 and 604 can each include a processor(s) (i.e., central processing unit(s)) and storage. More particularly, here the computing device 602 includes processor(s) 608 and storage 610. Similarly, the computing device 604 includes processor(s) 612 and storage 614. The processor(s) 608 and 612 can execute data in the form of computer-readable instructions to provide the functionality described herein. Data, such as computer-readable instructions, can be stored on the storage 610 and/or 614. The storage 610 and/or 614 can include one or more of volatile or non-volatile memory, hard drives, optical storage devices (e.g., CDs, DVDs etc.), or the like.

The devices 602 and 604 can also be configured to receive and/or generate data in the form of computer-readable instructions from one or more other storages, such as external storage 616 shown here. Examples of external storage can include optical storage devices (e.g., CDs, DVDs etc.) and flash storage devices (e.g., memory sticks or memory cards), among others. The computing devices may also receive data in the form of computer-readable instructions over the network(s) 606 that is then stored on the computing device(s) for execution by the processor(s). As used herein, the term "computer-readable media" can include transitory and non-transitory instructions. In contrast, the term "computer-readable storage media" excludes transitory instances. Computer-readable storage media can include "computer-readable storage devices". Examples of computer-readable storage devices include volatile storage media, such as RAM, and non-volatile storage media, such as hard drives, optical discs, and flash memory, among others.

Recall that by utilizing the described techniques, a VG tool can be provided that allows a user to easily define points and/or curves associated with an image that may be represented in a pixel grid. Accordingly, in this example the computing device 602 is shown as implementing at least part of a VG tool 618. The VG tool 618 can include any number of modules configured to provide the functionality described herein. For example, here the VG tool 618 is shown as including a TPS-based interpolation module 620, a feature editing module 622, and a VG image module 624. Additionally, in at least one embodiment, the VG tool 618 may include other modules that, for the sake of brevity, are not shown or described here.

The TPS-based interpolation module 620 can be configured to identify one or more features (e.g., points and/or curves) created in the pixel grid by the user. Additionally, the TPS-based interpolation module 620 may also be configured to interpolate individual color values to individual pixels of the pixel grid based on the identified feature(s) in accordance with the described TPS based interpolation techniques.

In at least one embodiment, the TPS-based interpolation module 620 can utilize a HOLSIF with a generalized TPS smoothness objective. As explained above, the HOLSIF can be solved to provide a set of individual color values to be interpolated to individual pixels of the pixel grid.

For example, the HOLSIF can include SD, FD, and ZD terms that can impose default smoothness penalties on pixels of the pixel grid. More particularly, the SD term can represent squared SDs over the pixels. When set to zero, the SD term zero can thus impose a second order smoothness penalty when the HOLSIF is solved. The FD term, in turn, can represent squared FDs over the pixels and impose a first order smoothness penalty when the HOLSIF is solved. The ZD term can represent individual squares of individual color values, and thus impose a zero order smoothness penalty when the HOLSIF is solved. Accordingly, the HOLSIF can effectively be used by the TPS-based interpolation module 620 to impose the default smoothness penalties on one or more pixels of the pixel grid.

The HOLSIF can also include a constraint term that represents constraints introduced by the attributes of the identified feature(s). The default smoothness penalties imposed by the SD, FD, and ZD terms can be interrupted in certain regions of the pixel grid that are subject to constraints imposed by the constraint term. Accordingly, the HOLSIF can effectively be used by the TPS-based interpolation module 620 to impose color value and/or derivative constraints (e.g., a zero FD constraint) on one or more pixels of the pixel grid.

The feature editing module 622, in turn, can be configured to allow the user to create and edit (e.g., modify and/or delete) various features, such as those identified by the TPS-based interpolation module 620. These features can include one or more of the points and/or curves (including compound curves) described above. With respect to compound curves for instance, in at least one embodiment, the user can be allowed to determine (e.g., manually configure) the offset distance τ between two adjacent curves in a compound curve when creating and/or editing the compound curve.

Finally, the VG image module 624 may be configured to represent the image in the pixel grid based on the set of individual color values provided by the HOLSIF's solution. For example, in at least one embodiment, the VG image module 624 can construct the VG image in a format that allows the image to be rendered on a display device (e.g., associated with computing device 602) in accordance with the display device's resolution capabilities.

In some embodiments, the computing device 602 may function in a stand-alone configuration such that all of the VG tool 618 is implemented by the computing device 602. In other words, in such embodiments the TPS-based interpolation module 620, feature editing module 622, and VG image module 624 may be implemented by resources provided by the computing device 602.

In other embodiments, at least some of the VG tool 618 may be implemented using other resources provided by the computing device 604 and/or one or more other computing devices. For example, all or part of the TPS-based interpolation module 620, feature editing module 622, and/or VG image module 624 may be implemented by the computing device 604.

Alternatively or additionally, all or part of the TPS-based interpolation module 620, feature editing module 622, and/or VG image module 624 may be implemented by cloud-based resources. The cloud-based resources may be provided by any number of known and/or unknown distributed computing devices connected to the computing device 602 via the network(s) 606 (e.g., via the cloud). Results of the processing may then be sent to the computing device 602.

The term "computing device", as used herein, can mean any type of device or devices having some amount of processing capability. Examples of computing devices can include traditional computing devices, such as personal computers (desktop, portable laptop, etc.), cell phones, smart phones, personal digital assistants, or any of a myriad of ever-evolving or yet to be developed types of computing devices.

Example Method

Figure 7:
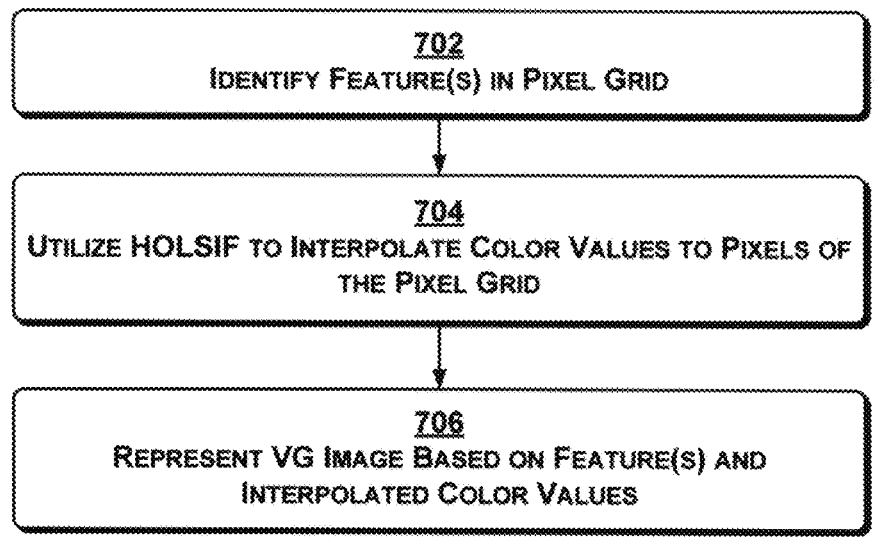
FIG. 7 illustrates an example method, in accordance with at least one embodiment.

FIG. 7 illustrates a flowchart of processes, techniques, or methods, generally denoted as a method 700, that is consistent with some implementations of the described TPS-based interpolation techniques.

For purposes of discussion, the method 700 is described in the context of the system 600. However, it is to be appreciated and understood that this is but one example and is not to be interpreted as limiting this method to being implemented in the system 600.

Regarding the method 700, at block 702 one or more features can be identified in a pixel grid. These feature(s) can be created and identified in any suitable way. For example, in at least one embodiment, the feature(s) may be created by a user via functionality provided by the feature editing module 622. The feature(s) created may then be identified by the TPS-based interpolation module 620.

At block 704, a TPS-based higher-order interpolating function can be utilized to interpolate color values to pixels of the pixel grid. For example, in operation this can include solving a HOLSIF to provide a set of individual color values to be assigned to each individual pixel of the pixel grid. In at least one embodiment, this can include setting partial derivatives of the HOLSIF to zero. The HOLSIF's smoothness objective can then be solved (e.g., minimized) to identify the set of individual color values.

As explained above, the HOLSIF's smoothness objective can be a generalized TPS smoothness objective that is quadratic and based on the sum of a number of different terms. For example, an SD term can represent squared SDs over pixels of the pixel grid, and can impose a second order smoothness penalty by penalizing non-zero SDs when the HOLSIF is solved.

The HOLSIF can also include a first-derivative (FD) term that represents the squared FDs over the pixels, and thus imposes a first order smoothness penalty on the pixels when the HOLSIF is solved. The HOLSIF can also include a zero-derivative (ZD) term that represents individual squares of the individual color values of the set, and thus introduces a zero order smoothness penalty.

As explained above, the HOLSIF can also include a constraint term that represents constraints introduced by the attributes of the feature(s) created by the user. The default smoothness penalties imposed by the SD, FD, and ZD terms can be interrupted in certain regions of the pixel grid (i.e., on individual pixel(s)) that are subject to constraints imposed by the constraint term when the HOLSIF is solved.

As also explained above, points and curves may introduce color value(s) and/or derivative constraint(s) that are represented by the constraint term, and thus that may affect the set of individual color values provided by solving the HOLSIF. In other words, the constraints introduced by points and/or curves may cause the constraint term to interrupt the smoothness of the SD, FD, and ZD terms in the HOLSIF. As a result, the constraints can affect one or more individual pixels of the pixel grid.

For example, a point or curve attribute(s) may interrupt the default smoothness penalties (imposed by the SD, FD, and ZD terms) by specifying one or more color values. As another example, and as also explained above, a curve attribute may interrupt the default smoothness penalties by removing an SD smoothness penalty associated with one or more of the pixels in the pixel grid. Alternatively or additionally, a curve attribute may anisotropically impose a FD constraint (e.g., zero FD constraint) for the pixel(s) in a particular direction.

In operation, the HOLSIF can be implemented in any suitable way. For example, in at least one embodiment, the HOLSIF can be utilized by the TPS-based Interpolation module 620 in response to the feature(s) being identified by the feature editing module 622.

At block 706, a VG image can be represented based on the attribute(s) of the identified feature(s) and the interpolated color values. For example, in at least one embodiment, the VG image module 624 can represent the VG image in the pixel grid as described above.

CONCLUSION

Methods, devices, systems, etc., pertaining to TPS-based interpolation techniques are described in language specific to structural features and/or methodological acts. However, it is to be understood that the subject matter defined in the appended claims is not necessarily limited to the specific features or acts described. Rather, the specific features and acts are disclosed as exemplary forms for implementing the claimed methods, devices, systems, etc.

The invention claimed is:

1. A method comprising:
identifying a feature in a pixel grid of a vector graphics image; and
utilizing an interpolating function with a generalized thin plate spline smoothness objective comprising smoothness terms to determine individual data type characteristics associated with the vector graphics image based on at least one attribute of the feature,
wherein at least one of the smoothness terms imposes a smoothness penalty based on derivatives,
and further wherein at least the utilizing is performed by a computing device.

2. The method of claim 1, wherein the feature comprises a point feature or curve feature.

3. The method of claim 1, wherein the utilizing further comprises determining individual color values at individual pixels of the pixel grid based on the at least one attribute.

4. The method of claim 3, wherein the smoothness penalty is a second order smoothness penalty based on second-derivatives or a first order smoothness penalty based on first-derivatives.

5. The method of claim 4, wherein the at least one attribute:
removes the second order smoothness penalty for at least one of the individual pixels; or
anisotropically imposes a first-derivative constraint for the at least one of the individual pixels.

6. The method of claim 5, wherein the at least one attribute anisotropically imposes the first-derivative constraint, further comprising penalizing non-zero first-derivatives in a direction of a tangent vector to the feature or in a direction normal to the feature.

7. The method of claim 1, wherein the interpolating function further comprises a constraint term that represents the at least one attribute and interrupts one or more of the smoothness terms.

8. One or more computer-readable storage media having instructions stored thereon that, when executed by a computing device, cause the computing device to perform acts, the acts comprising:
identifying a curve feature in a pixel grid; and
interpolating individual color values to pixels of the pixel grid based at least in part on the curve feature, wherein the interpolating comprises:
imposing a second order smoothness penalty for the pixels; and
for at least some of the pixels, removing the second order smoothness penalty or anisotropically imposing a first-derivative constraint.

9. The computer-readable storage media of claim 8, wherein a function with a thin plate spline smoothness objective is utilized to perform the interpolating.

10. The computer-readable storage media of claim 8, wherein an attribute of the curve feature causes one or more second-derivative smoothness (SDS) kernels that overlap the curve feature in the pixel grid to be removed, wherein each of the SDS kernels imposes the second order smoothness penalty for at least one group of two or more of the pixels.

11. The computer-readable storage media of claim 8, wherein an attribute of the curve feature causes:
one or more second-derivative smoothness (SDS) kernels in the pixel grid that overlap the curve feature to be removed, wherein each SDS kernel imposes the second order smoothness penalty for at least one group of two or more of the pixels; and
one or more generalized first-derivative (GFD) kernels to be added in the pixel grid along the curve feature, wherein each GFD kernel anisotropically imposes the first-derivative constraint for at least one other group of two or more of the pixels in a direction normal to the curve feature.

12. The computer-readable storage media of claim 11, wherein the at least one group and the at least one other group have at least one pixel in common.

13. The computer-readable storage media of claim 8, wherein an attribute of the curve feature causes one or more generalized first-derivative (GFD) kernels to be added in the pixel grid along the curve feature, wherein each GFD kernel anisotropically imposes the first-derivative constraint for at least one group of two or more of the pixels in a direction of a tangent vector to the curve feature or in a direction normal to the curve feature.

14. The computer-readable storage media of claim 8, wherein the curve feature comprises a compound curve feature that includes a plurality of individual curve features, wherein at least two of the plurality of individual curve features are associated with different respective attributes.

15. The computer-readable storage media of claim 8, further comprising representing a vector graphics image in the pixel grid based at least in part on the curve feature.

16. A system comprising:
a processing device; and
a storage device storing computer-executable instructions which, when executed by the processing device, cause the processing device to:
allow a feature to be created in a pixel grid associated with a vector graphics image, and
interpolate a set of color values by imposing a smoothness penalty on at least one pixel of the pixel grid.

17. The system of claim 16, wherein the smoothness penalty is a second order smoothness penalty and the instructions further cause the processing device to utilize a function with a thin plate spline (TPS) smoothness objective to impose the second order smoothness penalty.

18. The system of claim 16, wherein the feature comprises a curve feature.

19. The system of claim 16, wherein the smoothness penalty is a first-derivative constraint based on an attribute of the feature.

20. The system of claim 16, wherein the feature comprises a single compound curve feature that causes a plurality of individual curve features to be created in the pixel grid when the single compound curve feature is sketched by a user.

* * * * *